(12) United States Patent
Bernatz et al.

(10) Patent No.: US 7,731,865 B2
(45) Date of Patent: Jun. 8, 2010

(54) LIQUID-CRYSTAL MEDIUM

(75) Inventors: Georg Bernatz, Darmstadt (DE); Andreas Taugerbeck, Darmstadt (DE); Matthias Bremer, Darmstadt (DE); Achim Goetz, Alsbach-Haehnlein (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/254,869

(22) Filed: Oct. 21, 2008

(65) Prior Publication Data

US 2009/0103011 A1 Apr. 23, 2009

(30) Foreign Application Priority Data

Oct. 22, 2007 (DE) .................. 10 2007 050 262

(51) Int. Cl.
*C09K 19/00* (2006.01)
*C09K 19/06* (2006.01)
*C09K 19/52* (2006.01)

(52) U.S. Cl. .............. 252/299.01; 252/299.6; 252/299.62; 252/299.66; 430/20; 428/1.1

(58) Field of Classification Search ........... 252/299.01, 252/299.6, 299.62, 299.66; 430/20; 428/1.1
See application file for complete search history.

(56) References Cited

U.S. PATENT DOCUMENTS

| 5,382,379 | A | 1/1995 | Onji et al. |
| 6,177,972 | B1 | 1/2001 | Held et al. |
| 6,287,650 | B1 | 9/2001 | Pauluth et al. |
| 6,511,720 | B2 | 1/2003 | Pauluth et al. |
| 2004/0138394 | A1 | 7/2004 | Buchecker et al. |
| 2004/0191428 | A1 | 9/2004 | Tsuda et al. |
| 2009/0109392 | A1 | 4/2009 | Hsieh et al. |

FOREIGN PATENT DOCUMENTS

| DE | 102 29 828 A1 | 2/2003 |
| DE | 10 2005 027 763 A1 | 1/2006 |
| DE | 10 2005 024 400 A1 | 11/2006 |
| EP | 272580 | 6/1988 |
| EP | 1219651 | 7/2002 |
| EP | 1 378 557 A1 | 1/2004 |
| EP | 1 498 468 A1 | 1/2005 |
| EP | 1 559 745 A1 | 8/2005 |
| EP | 1 626 079 A1 | 2/2006 |
| EP | 1 627 905 A1 | 2/2006 |
| GB | 2 379 931 A | 3/2003 |
| JP | 06206836 | 7/1994 |
| JP | 08246960 | 9/1996 |
| JP | 10-36847 A | 2/1998 |

OTHER PUBLICATIONS

CAPLUS 1989 : 67032.
English translation by computer for JP 08-245960, http://www4.ipdl.inpit.go.jp/Tokujitu/PAJdetail.ipdl?N0000=60&NO120=2&N3001=H08-245960.
CAPLUS 2002:503401.

*Primary Examiner*—Geraldina Visconti
(74) *Attorney, Agent, or Firm*—Millen, White, Zelano, Branigan, P.C.

(57) ABSTRACT

The present invention relates to liquid-crystal (LIQUID CRYSTALLINE) media comprising polymerizable compounds, in particular for use in LIQUID CRYSTALLINE displays of the PS (polymer stabilized) or PSA (polymer sustained alignment) type, and to PS(A) displays containing LIQUID CRYSTALLINE media of this type.

16 Claims, No Drawings

LIQUID-CRYSTAL MEDIUM

The present invention relates to liquid-crystal (LIQUID CRYSTALLINE) media comprising polymerizable compounds, in particular for use in LIQUID CRYSTALLINE displays of the PS (polymer stabilised) or PSA (polymer sustained alignment) type, and to PS(A) displays containing LIQUID CRYSTALLINE media of this type.

The liquid-crystal displays (LIQUID CRYSTALLINE displays) used at present are mostly those of the TN (twisted nematic) type. However, these have the disadvantage of a strong viewing-angle dependence of the contrast.

In addition, so-called VA (vertical alignment) displays are known which have a broader viewing angle. The LIQUID CRYSTALLINE cell of a VA display contains a layer of an LIQUID CRYSTALLINE medium between two transparent electrodes, where the LIQUID CRYSTALLINE medium usually has a negative value of the dielectric (DC) anisotropy. In the switched-off state, the molecules of the LIQUID CRYSTALLINE layer are aligned perpendicular to the electrode surfaces (homeotropically) or have a tilted homeotropic alignment. On application of an electrical voltage to the electrodes, a realignment of the LIQUID CRYSTALLINE molecules parallel to the electrode surfaces takes place.

Furthermore, OCB (optically compensated bend) displays are known which are based on a birefringence effect and have an LIQUID CRYSTALLINE layer with a so-called "bend" alignment and usually positive (DC) anisotropy. On application of an electrical voltage, a realignment of the LIQUID CRYSTALLINE molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are IPS (in the-plane switching) displays which contain an LIQUID CRYSTALLINE layer between two substrates, only one of which has an electrode layer, usually with a comb-shaped structure. On the application of a voltage, an electric field is thereby generated which has a significant component parallel to the LIQUID CRYSTALLINE layer. This causes re-alignment of the LIQUID CRYSTALLINE molecules in the layer plane. Furthermore, so-called FFS (fringe Field switching) displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of a structured (comb-shaped) electrode, and the other electrode is unstructured. A strong so-called "fringe field" is thereby generated, i.e. a strong electric field close to the edge of the electrodes and an electric field which has both a strong vertical component and a strong horizontal component throughout the cell. Both IPS displays and also FFS displays have low viewing-angle dependence of the contrast.

In VA displays of the more recent type, uniform alignment of the LIQUID CRYSTALLINE molecules is restricted to a plurality of relatively small domains within the LIQUID CRYSTALLINE cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LIQUID CRYSTALLINE molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electrical field in the LIQUID CRYSTALLINE cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PS (polymer-stabilized) displays, which are also known under the term "PSA" (polymer sustained alignment). In these, a small amount (for example 0.3% by weight, typically<1% by weight) of a polymerizable compound is added to the LIQUID CRYSTALLINE medium and, after introduction into the LIQUID CRYSTALLINE cell, is polymerized or crosslinked in situ, usually by UV photopolymerization, with an electrical voltage applied between the electrodes. The addition of polymerizable mesogenic or liquid-crystalline compounds, also known as "reactive mesogens" (RMs), to the LIQUID CRYSTALLINE mixture has proven particularly suitable.

In the meantime, the PS or PSA principle is being used in classical LIQUID CRYSTALLINE displays. Thus, for example, PSA-VA, PSA-OCB, PS-IPS and PS-TN displays are known. As can be demonstrated in test cells, the PSA method results in a pretilt in the cell. In the case of PSA-OCB displays, it is therefore possible for the bend structure to be stabilised so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

In particular for monitor and especially TV applications, optimisation of the response times, but also of the contrast and luminance (thus also transmission), of the LIQUID CRYSTALLINE display is still desired. The PS(A) method appears to give crucial advantages here. In particular in the case of PSA-VA, a shortening of the response times, which correlate with a pretilt which can be measured in test cells, can be achieved without significant adverse effects on other parameters.

However, not every desired soluble RM by far is suitable for use in PS(A) displays, and it is often difficult to find more suitable selection criteria than the direct PSA experiment with pretilt measurement. In addition, the selected "material system" of LIQUID CRYSTALLINE mixture (also referred to below as "LIQUID CRYSTALLINE host mixture")+polymerizable component should have the lowest possible rotational viscosity and the best possible electrical properties—the so-called "voltage holding ratio" (HR or VHR) should be emphasised here. In connection with PSA-VA, a high HR after irradiation with (UV) light is, in particular, of central importance since this is a vital part of the process—but of course also occurs as "normal" loading in the finished display.

However, the problem arises that not all LIQUID CRYSTALLINE mixture+polymerizable component combinations by far "function" since, for example, an inadequate tilt or none at all arises, or since, for example, the HR is inadequate for TET display applications. In particular, the use of low-molecular-weight compounds containing alkenyl groups as components of the LIQUID CRYSTALLINE host mixture can result in such problems. On the other hand, however, alkenyl compounds are generally desired in LIQUID CRYSTALLINE media, and also in PS(A) displays as components of the (unpolymerized) LIQUID CRYSTALLINE host mixture, since they facilitate low rotational viscosities and thus fast response times.

The choice becomes even smaller if polymerization by means of UV light without the addition of photoinitiators is desired, which may be advantageous for certain applications.

Thus, there continues to be a great demand for PS(A) displays, in particular of the VA and OCB type, and LIQUID CRYSTALLINE media and polymerizable compounds for use in such displays, which do not have the disadvantages described above or only do so to a small extent and have improved properties. In particular, there is a great demand for PS(A) displays or materials having a high specific resistance at the same time as a large working-temperature range, short response times, even at low temperatures, and a low threshold voltage, which facilitate a large number of grey shades, high contrast and a wide viewing angle, and have high values of the voltage holding ratio (HR) after UV exposure.

The invention was based on the object of providing PS(A) displays which do not have the disadvantages indicated above or only do so to a reduced extent, enable the setting of a pretilt angle and preferably at the same time have very high specific resistance values, low threshold voltages and short response times.

Surprisingly, it has now been found that this object can be achieved by using PS(A) displays according to the invention in which the polymerizable component of the LIQUID CRYSTALLINE medium (RM) consists of compounds containing methacrylate groups, and the low-molecular-weight component ("LIQUID CRYSTALLINE host mixture") comprises one or more alkenyl compounds. It has been found that, on the one hand, very good values arise in the HR, in particular after UV exposure, and, on the other hand, very good tilt values can be achieved for LIQUID CRYSTALLINE media which comprise alkenyl compounds on use of polymerizable components containing methacrylate groups in addition, the use of alkenyl compounds in the LIQUID CRYSTALLINE host mixture enables lower rotational viscosities and thus very short response times to be achieved in the LIQUID CRYSTALLINE mixture. This material combination is therefore particularly suitable for use in TFT-PSA-VA displays. In particular, LIQUID CRYSTALLINE host mixtures comprising various alkenyl compounds exhibit very similar, good tilts for a wide range of different specific alkenyl compounds on addition of methacrylate RMs. By contrast, the same LIQUID CRYSTALLINE host mixtures exhibit significantly poorer HR (UV) values and in addition a reduced or in some cases even totally suppressed tilt generation on addition of, for example, acrylate RMs.

The invention relates to a liquid-crystal (LIQUID CRYSTALLINE) medium comprising one or more polymerizable compounds, where all polymerizable compounds present in the LIQUID CRYSTALLINE medium contain exclusively methacrylate groups as polymerizable group(s), and one or more mesogenic or liquid-crystalline compounds containing one or more alkenyl groups which are stable to a polymerization reaction under the conditions used for the polymerization of the methacrylate groups.

The invention furthermore relates to an LIQUID CRYSTALLINE medium comprising
- a polymerizable component A) comprising one or more polymerizable compounds, where all polymerizable compounds present in the LIQUID CRYSTALLINE medium contain exclusively methacrylate group(s) as polymerizable group(s), as described above and below, and
- a liquid-crystalline component B) comprising one or more, preferably two or more, low-molecular-weight (i.e. monomeric or unpolymerized) compounds, including at least one mesogenic or liquid-crystalline compound containing one or more alkenyl groups which are stable to a polymerization reaction under the conditions used for the polymerization of the methacrylate groups.

The invention of furthermore relates to the use of LIQUID CRYSTALLINE media according to the invention in LIQUID CRYSTALLINE displays, in particular in PS and PSA displays.

The invention furthermore relates to an LIQUID CRYSTALLINE display containing an LIQUID CRYSTALLINE medium according to the invention, in particular a PS (polymer stabilised) or PSA (polymer sustained alignment) display, particularly preferably a PSA-VA, PSA-OCB, PS-IPS, PS-FFS or PS-TN display.

The invention furthermore relates to an LIQUID CRYSTALLINE display of the PS or PSA type, preferably containing an LIQUID CRYSTALLINE cell consisting of two substrates, where at least one substrate is transparent to light and at least one substrate has an electrode layer, and a layer of an LIQUID CRYSTALLINE medium comprising a polymerized component and a low-molecular-weight component located between the substrates, where the polymerized component is obtainable by polymerization of one or more polymerizable compounds between the substrates of the LIQUID CRYSTALLINE cell in the LIQUID CRYSTALLINE medium with application of an electrical voltage, characterised in that all polymerizable compounds present in the LIQUID CRYSTALLINE medium contain exclusively methacrylate group(s) as polymerizable group(s), and the low-molecular-weight component comprises one or more mesogenic or liquid-crystalline compounds containing one or more alkenyl groups which are stable to a polymerization reaction under the conditions used for polymerization of the methacrylate groups.

The invention furthermore relates to an LIQUID CRYSTALLINE medium comprising one or more polymerizable methacrylate compounds and one or more alkenyl compounds as described above and below.

Particular preference is given to LIQUID CRYSTALLINE media comprising one, two or three polymerizable methacrylate compounds as described above and below.

Preference is furthermore given to achiral polymerizable methacrylate compounds and to LIQUID CRYSTALLINE media comprising, preferably exclusively consisting of, achiral compounds.

Preference is furthermore given to PSA displays and LIQUID CRYSTALLINE media in which the polymerizable component or component A) comprises one or more polymerizable compounds containing a methacrylate group (monoreactive) and one or more polymerizable compounds containing two or more, preferably two, methacrylate groups (di-or multireactive).

Preference is furthermore given to PSA displays and LIQUID CRYSTALLINE media in which the polymerizable component or component A) comprises exclusively polymerizable compounds containing two methacrylate groups (direactive).

The polymerizable compounds may be added individually to the LIQUID CRYSTALLINE media, but it is also possible to use mixtures comprising two or more polymerizable compounds according to the invention. On polymerization of such mixtures, copolymers are formed. The invention furthermore relates to the polymerizable mixtures mentioned above and below. The polymerizable compounds are mesogenic or non-mesogenic, preferably mesogenic or liquid-crystalline.

Preference is furthermore given to LIQUID CRYSTALLINE media in which the low-molecular-weight component or component B) is an LIQUID CRYSTALLINE compound or an LIQUID CRYSTALLINE mixture which has a nematic liquid-crystal phase.

In a preferred embodiment of the invention, the polymerizable compounds are selected from formula I:

$$R^a\text{-}A^1\text{-}(Z^1\text{-}A^2)_{m1}\text{-}R^b \qquad \text{I}$$

in which the individual radicals have the following meaning:
$A^1$ and $A^2$ each, independently of one another, an aromatic, heteroaromatic, alicyclic or heterocyclic group, preferably having 4 to 25 C atoms, which may also contain fused rings, and which is optionally mono- or polysubstituted by L,
$Z^1$ on each occurrence, identically or differently, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond,
L, $R^a$ and $R^b$ each, independently of one another, H, OH, halogen, SF$_5$, NO$_2$, a carbon group or hydrocarbon group, where the compounds contain at least one radical L, $R^a$ and $R^b$ which denotes or contains a group P-Sp-,
$R^0$ and $R^{00}$ each, independently of one another, H or alkyl having 1 to 12 C atoms,
CH$_2$=C(CH$_3$)—COO—,
Sp a spacer group or a single bond,
m1 0, 1, 2, 3 or 4,
n1 1, 2, 3 or 4.

Particularly preferred compounds of the formula I are those in which
$A^1$ and $A^2$ each, independently of one another, denote 1,4-phenylene, naphthalene-1,4-diyl or naphthalene-2,6-diyl, in which, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L,
L denotes P-Sp-, OH, CH$_2$OH, F, Cl, Br, I, —CN, —NO$_2$, —NCO, —NCS, —OCN, —SCN, —C(=O)N(R$^x$)$_2$, C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkyliquid crystallinearbonyl, alkoxycarbonyl, alkyliquid crystallinearbonyloxy or alkoxycarbonyloxy having 1 to 25 C atoms, in which, in addition, one or more H atoms may be replaced by F, Cl or P-Sp-,
$Y^1$ denotes halogen,
$R^x$ denotes P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms, or an optionally substituted heteroaryl or heteroaryloxy group having 2 to 40 C atoms,
$R^a$ and $R^b$ each, independently of one another, denote P-Sp-, H, L as defined above, or straight-chain or branched alkyl having 1 to 25 C atoms, in which, in addition, one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$, $R^b$ and L contains at least one group P-Sp-.

Particular preference is given to compounds of the formula I in which one or both radicals $R^a$ and $R^b$ denote P-Sp-.

Particularly preferred compounds of the formula I are selected from the following sub-formulae:

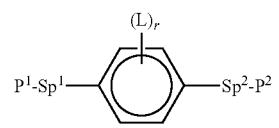

I1

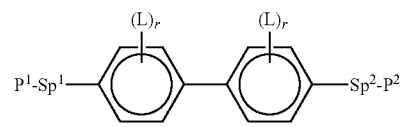

I2

[Structures I3–I12 shown on the left column]

in which
P¹ and P² have the meaning indicated for P,
Sp¹ and Sp² have one of the meanings indicated for Sp or denote a single bond,
$Z^2$ and $Z^3$ each, independently of one another, denote —COO— or —OCO—,
L has the meaning indicated above,
L' and L" each, independently of one another, denote H, F or Cl,
r denote 0, 1, 2, 3 or 4,
s denote 0, 1, 2 or 3,
t denote 0, 1 or 2,
x denote 0 or 1, and
$R^y$ and $R^z$ each, independently of one another, denote H or $CH_3$.

In a further preferred embodiment of the invention, the polymerizable compounds are chiral compounds selected from formula II:

$$(R^*-(A^1-Z^1)_{m1})_k-Q \qquad \mathrm{II}$$

in which $A^1$, $Z^1$ and m1 have on each occurrence, identically or differently, one of the meanings indicated in formula I,
R* has on each occurrence, identically or differently, one of the meanings indicated for $R^a$ in formula I,
Q denotes a k-valent chiral group, which is optionally mono- or polysubstituted by L,
k is 1, 2, 3, 4, 5 or 6,
where the compounds contain at least one radical R* or L which denotes or contains a group P—Sp— as defined above.

Particularly preferred compounds of the formula II contain a monovalent group Q of the formula III

[Structure III: binaphthyl-type structure with A*, B*, (L)_r, (L)_t groups, and $-O-(CH_2)_u-$ chains]

in which L and r have on each occurrence, identically or differently, the meaning indicated above,
A* and B* each, independently of one another, denote fused benzene, cyclohexane or cyclohexene,
t on each occurrence, identically or differently, denotes 0, 1 or 2, and
u on each occurrence, identically or differently, denotes 0, 1 or 2.

Particular preference is given to groups of the formula III in which x denotes 1 or 2.

Further preferred compounds of the formula II contain a monovalent group Q or one or more groups R* of the formula IV $$—Q^1—\overset{*}{C}H—Q^2 \atop \quad\; |\atop \quad\; Q^3 \qquad \mathrm{IV}$$

in which
$Q^1$ denotes alkylene or alkyleneoxy having 1 to 9 C atoms or a single bond,
$Q^2$ denotes optionally fluorinated alkyl or alkoxy having 1 to 10 C atoms, in which, in addition, one or two non-adjacent $CH_2$ groups may be replaced by —O—, —S—, —CH=CH—, —CO—, —OCO—, —COO—, —O—COO—, —S—CO—, —CO—S— or —C≡C— in such a way that O and/or S atoms are not linked directly to one another, Q³ denotes F, Cl, CN or alkyl or alkoxy as defined for Q², but different from Q².

Preferred groups of the formula IV are, for example, 2-butyl(=1-methyl-propyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyl-oxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxa-pentyl, 2-methyl-3-oxa-hexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoro-methyloctyloxy.

Further preferred compounds of the formula II contain a divalent group Q of the formula V

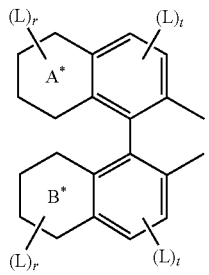

V in which L, r, t, A* and B* have the meaning indicated above.

Further preferred compounds of the formula II contain a divalent group Q selected from the following formulae:

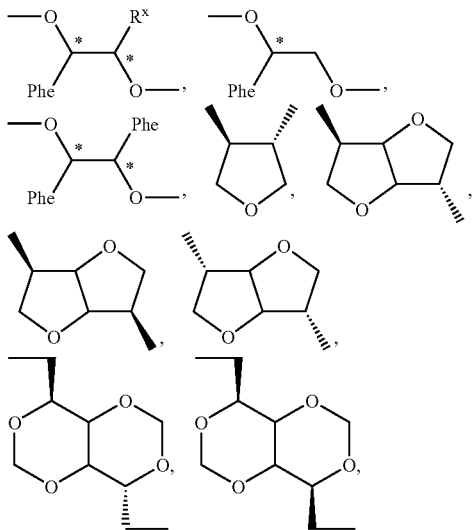

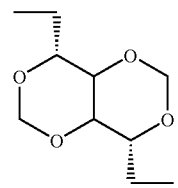

-continued in which Phe denotes phenyl, which is optionally mono- or polysubstituted by L, and R$^x$ denotes F or optionally fluorinated alkyl having 1 to 4 C atoms.

Particularly preferred compounds of the formula II are selected from the following sub-formulae.

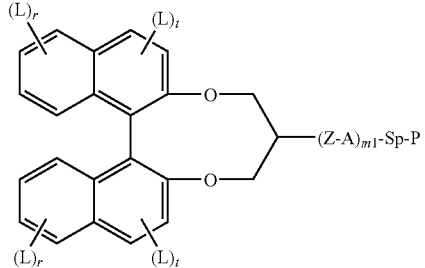

II1

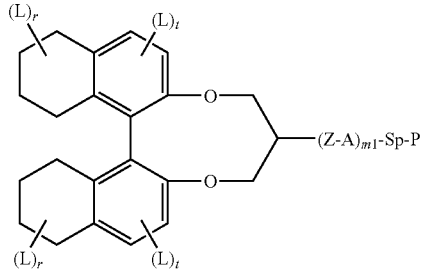

II2

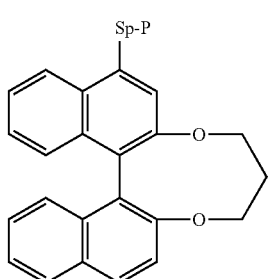

II3

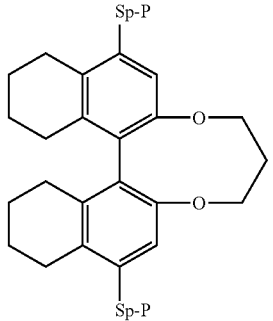

II4

-continued

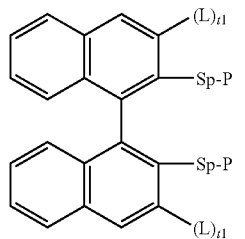

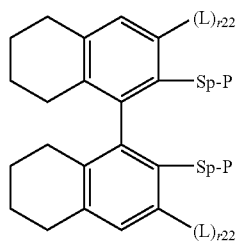

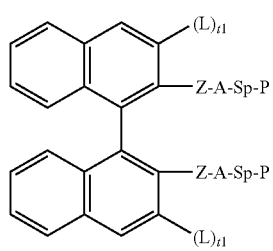

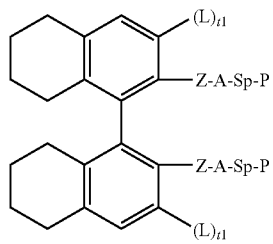

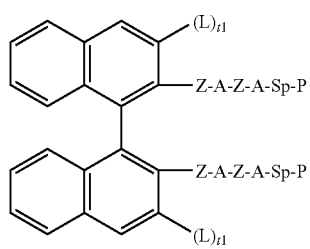

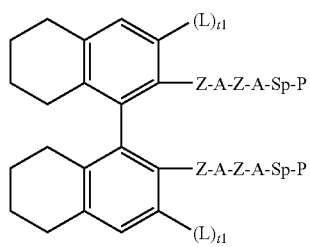

-continued

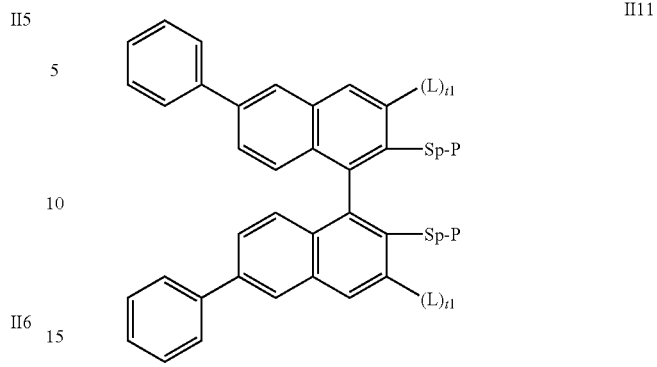

in which L, P, Sp, m1, r and t have the meaning indicated above, Z or A on each occurrence, identically or differently, one of the meanings indicated for $Z^1$ or $A^1$ respectively, and t1 on each occurrence, identically or differently, denotes 0 or 1.

In a further preferred embodiment of the invention, the compounds of the formula I and sub-formulae thereof contain one or more branched radicals $R^a$ and/or $R^b$ and/or L containing two or more methacrylate groups (multi-functional polymerizable radicals). Suitable radicals of this type, and polymerizable compounds containing them, are described, for example, in U.S. Pat. No. 7,060,200 B1 or US 2006/0172090 A1. Particular preference is given to multifunctional polymerizable radicals selected from the following formulae:

| | |
|---|---|
| —X-alkyl-CHP—CH$_2$—CH$_2$P | I*a |
| —X-alkyl-C(CH$_2$P)(CH$_2$P)—CH$_2$P | I*b |
| —X-alkyl-CHPCHP—CH$_2$P | I*c |
| —X-alkyl-C(CH$_2$P)(CH$_2$P)—C$_{aa}$H$_{2aa+1}$ | I*d |
| —X-alkyl-CHP—CH$_2$P | I*e |
| —X-alkyl-CHPP | I*f |
| —X-alkyl-CPP—C$_{aa}$H$_{2aa+1}$ | I*g |
| —X-alkyl-C(CH$_2$P)(CH$_2$P)—CH$_2$OCH$_2$—C(CH$_2$P)(CH$_2$P)CH$_2$P | I*h |
| —X-alkyl-CH((CH$_2$)$_{aa}$P)((CH$_2$)$_{bb}$)P | I*i |
| —X-alkyl-CHPCHP-C$_{aa}$H$_{2aa+1}$ | I*k |
| —X'-alkyl-C(CH$_3$)(CH$_2$P$^1$)(CH$_2$P$^2$) | I*m | in which
alkyl denotes a single bond or straight-chain or branched alkylene having 1 to 12 C atoms, in which one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl or CN, where R$^x$ has the meaning indicated above and preferably denotes R$^0$ as defined above, aa and bb each, independently of one another, denote 0, 1, 2, 3, 4, 5 or 6, X has one of the meanings indicated for X', and P denotes $CH_2$=$C(CH_3)$—COO—.

The following meanings apply above and below:

The term "PSA" is used, unless indicated otherwise, to represent PSA displays and PSA displays.

The term "mesogenic group" is known to the person skilled in the art and described in the literature, and denotes a group which, due to the anisotropy of its attracting and repelling interactions, essentially contributes to the formation of a liquid-crystal (LIQUID CRYSTALLINE) phase in low-molecular-weight or polymeric substances. Compounds containing mesogenic groups (mesogenic compounds) do not necessarily themselves have to have an LIQUID CRYSTALLINE phase. It is also possible for mesogenic compounds to exhibit LIQUID CRYSTALLINE phase behaviour only after mixing with other compounds and/or after polymerization. Typical mesogenic groups are, for example, rigid rod- or disc-shaped units. An overview of the terms and definitions used in connection with mesogenic or LIQUID CRYSTALLINE compounds is given in Pure Appl. Chem. 73(5), 888 (2001) and C. Tschierske, G. Pelzl, S. Diele, Angew. Chem. 2004,116, 6340-6368.

The term "spacer group", also referred to as "Sp" above and below, is known to the person skilled in the art and described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below refers to a flexible group which connects the mesogenic group and the polymerizable group(s) in a polymerizable mesogenic compound ("RM") to one another.

The term "organic group" denotes a carbon or hydrocarbon group.

As used herein, Applicants intend the term "carbon group" to denote a mono- or polyvalent organic group containing at least one carbon atom, where this either contains no further atoms (such as, for example, —C≡C—) or, if desired, contains one or more further atoms, such as, for example, N, O, S, P, Si, Se, As, Te or Ge (for example carbonyl, etc.). Applicants intend the term "hydrocarbon group" to denote a carbon group which additionally contains one or more H atoms and optionally one or more heteroatoms, such as, for example, N, O, S, P, Si, Se, As, Te or Ge.

"Halogen" denotes F, Cl, Br or I.

Applicants intend the terms "carbon" or "hydrocarbon group" to be a saturated or unsaturated group. Unsaturated groups are, for example, aryl, alkenyl or alkynyl groups. A carbon or hydrocarbon radical having more than 3 C atoms may be straight-chain, branched and/or cyclic, and may also contain spiro links or condensed rings.

The terms "alkyl", "aryl", "heteroaryl", etc. also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms.

Preferred carbon and hydrocarbon groups are optionally substituted alkyl, alkenyl, alkynyl, alkoxy, alkyliquid crystallinearbonyl, alkoxycarbonyl, alkyliquid crystallinearbonyloxy and alkoxycarbonyloxy having 1 to 40, preferably 1 to 25, particularly preferably 1 to 18, C atoms, optionally substituted aryl or aryloxy having 6 to 40, preferably 6 to 25, C atoms, or optionally substituted alkylaryl, arylalkyl, alkylaryloxy, arylalkyloxy, aryliquid crystallinearbonyl, aryloxycarbonyl, aryliquid crystallinearbonyloxy and aryloxycarbonyloxy having 6 to 40, preferably 6 to 25, C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25, C atoms, which are unsubstituted or mono- or polysubstituted by F, Cl, Br, I or CN, and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms, or an optionally substituted heteroaryl or heteroaryloxy group having 2 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, peryiene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinotine, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]-thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5, 6, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silmane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The biaryl skeleton of the formula

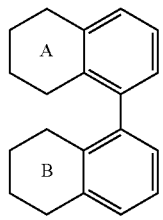

is preferably selected from the following formulae:

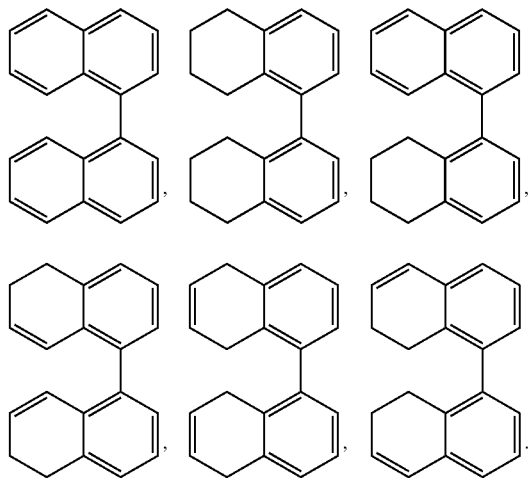

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the meaning indicated above, and $Y^1$ denotes halogen, optionally substituted silyl or aryl having 6 to 40, preferably 6 to 20, C atoms, and straight-chain or branched alkyl, alkoxy, alkyliquid crystallinearbonyl, alkoxycarbonyl, alkyliquid crystallinearbonyloxy or alkoxycarbonyloxy having 1 to 25 C atoms, in which one or more H atoms may optionally be replaced by F or Cl.

"Substituted silyl or aryl" preferably means substituted by halogen, —CN, $R^o$, —$OR^o$, —CO—$R^o$, —CO—O—$R^o$, —O—CO—$R^o$ or —O—CO—O—$R^o$, in which $R^o$ has the meaning indicated above.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

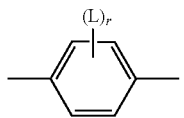

is preferably

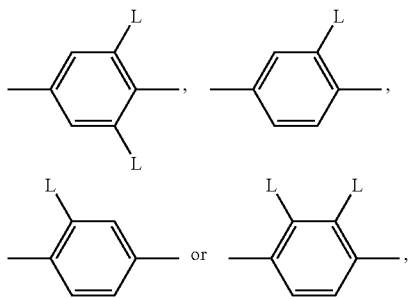

in which L has one of the meanings indicated above.

Preferred spacer groups Sp are selected from the formula Sp'-X' so that the radical "P-Sp-" corresponds to the formula "P-Sp'-X'—", where Sp' denotes alkylene having 1 to 20, preferably 1 to 12, C atoms, which is optionally mono- or polysubstituted by F, Cl, Br, I or CN, and in which, in addition, one or more non-adjacent CH$_2$ groups may each be replaced, independently of one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a way that O and/or S atoms are not linked directly to one another, X' denotes —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond, R$^0$ and R$^{00}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups —X'-Sp'-are —(CH$_2$)$_{p1}$—, —O—(CH$_2$)$_{p1}$—, —OCO— (CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Preference is furthermore given to polymerizable compounds in which Sp denotes a single bond.

The preparation of the polymerizable compounds is carried out analogously to the processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerizable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-A$^1$-(Z$^1$-A$^2$)$_{m1}$—OH, in which A$^1$, A$^2$, Z$^1$ and m1 have the meanings indicated above, such as, for example, 2,6-dihydroxynaphthalene(naphthalene-2,6-diol) or 1-(4-hydroxyphenyl)phenyl-4-ol, using corresponding acids, acid derivatives, or halogenated compounds containing a group P, such as, for example, methacryloyl chloride or methacrylic acid, in the presence of a dehydrating reagent, such as, for example, DCC (dicyclohexyliquid crystallinearbodiimide).

The polymerizable compounds are polymerized or crosslinked in the LIQUID CRYSTALLINE medium between the substrates of the LIQUID CRYSTALLINE display with application of a voltage by in-situ polymerization (if a compound contains two or more polymerizable groups). Suitable and preferred polymerization methods are, for example, thermal or photopolymerization, preferably photopolymerization, in particular UV photopolymerization. One or more initiators may optionally also be added here. Suitable conditions for the polymerization, and suitable types and amounts of initiators, are known to the person skilled in the art and described in the literature. Suitable for free-radical polymerization are, for example, the commercially available photoinitiators Irgacure651φ, Irgacure184®, Irgacure907®, Irgacure369®, or Darocure1173® (Ciba AG). If an initiator is employed, its proportion in the mixture as a whole is preferably 0.001 to 5% by weight, particularly preferably 0.001 to 1% by weight. However, the polymerization can also be carried out without addition of an initiator. In a further preferred embodiment, the LIQUID CRYSTALLINE medium does not comprise a polymerization initiator.

The polymerizable component A) or the LIQUID CRYSTALLINE medium may also comprise one or more stabilisers in order to prevent undesired spontaneous polymerization of the RMs, for example during storage or transport. Suitable types and amounts of stabilisers are known to the person skilled in the art and described in the literature. Particularly suitable are, for example, the commercially available stabilisers from the Irganox ® series (Ciba AG). If stabilisers are employed, their proportion, based on the total amount of RMs or polymerizable component A), is preferably 10-5000 ppm, particularly preferably 50-500 ppm.

The polymerizable compounds according to the invention are also suitable for polymerization without an initiator, which is associated with considerable advantages, such as, for example, lower materials costs and in particular less contamination of the LIQUID CRYSTALLINE medium by possible residual amounts of the initiator or degradation products thereof.

The LIQUID CRYSTALLINE media according to the invention preferably comprise<5%, particularly preferably<1%, very particularly preferably<0.5%, of polymerizable compounds, in particular polymerizable compounds of the formulae mentioned above.

Besides the polymerizable compounds described above, the LIQUID CRYSTALLINE media according to the invention comprise a low-molecular-weight component. The low-molecular-weight component is preferably an LIQUID CRYSTALLINE mixture ("LIQUID CRYSTALLINE host mixture") comprising one or more, preferably two or more, low-molecular-weight (i.e. monomeric or unpolymerized) compounds, where at least one of these compounds is a mesogenic or liquid-crystalline compound containing one or more alkenyl groups ("alkenyl compound"), where these alkenyl groups are stable to a polymerization reaction under the conditions used for the polymerization of the methacrylate groups.

The alkenyl groups are preferably straight-chain, branched or cyclic alkenyl, in particular having 2 to 25 C atoms, particularly preferably having 2 to 12 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F and/or Cl.

Preferred alkenyl groups are straight-chain alkenyl having 2 to 7 C atoms and cyclohexenyl, in particular ethenyl, propenyl, butenyl, pentenyl, hexenyl, heptenyl, 1,4-cyclohexen-1-yl and 1,4-cyclohexen-3-yl.

In LIQUID CRYSTALLINE media for use in PSA-VA displays, the low-molecular-weight component preferably comprises one or more alkenyl compounds of the formulae A and/or B:

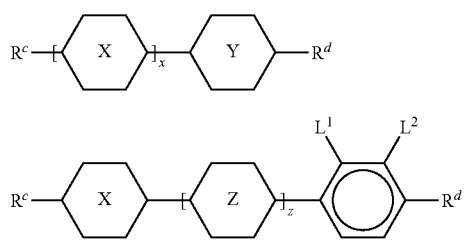

A

B in which the individual radicals, on each occurrence identically or differently, each, independently of one another, have the following meaning:

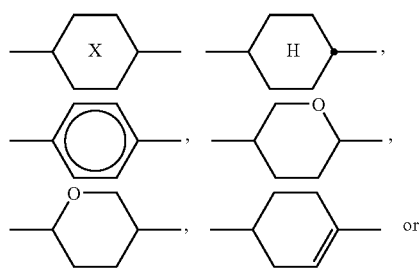

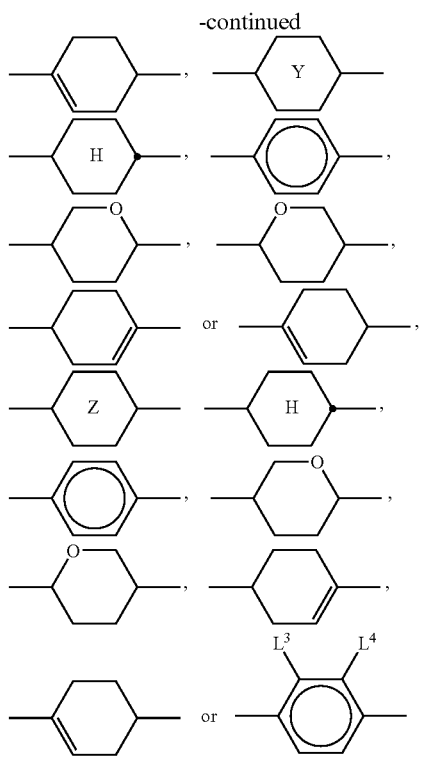

$R^c$ alkenyl having 2 to 9 C atoms or, if at least one of the rings X, Y and Z denotes cyclohexenyl, also one of the meanings of $R^d$, $R^d$ alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $L^{1-4}$ each, independently of one another, H, F, Cl, $OCF_3$, $CF_3$, $CH_3$, $CH_2F$ or $CHF_2H$, preferably H, F or Cl, x 1 or 2, z 0 or 1.

$R^d$ is preferably straight-chain alkyl or alkoxy having 1 to 8 C atoms or straight-chain alkenyl having 2 to 7 C atoms.

The LIQUID CRYSTALLINE medium preferably comprises no compounds containing a terminal vinyloxy group (—O—CH=$CH_2$), in particular no compounds of the formula A or B in which $R^d$ denotes or contains a terminal vinyloxy group (—O—CH=$CH_2$).

Preferably, $L^1$ and $L^2$ denote F, or one of $L^1$ and $L^2$ denotes F and the other denotes Cl, and $L^3$ and $L^4$ denote F, or one of $L^3$ and $L^4$ denotes F and the other denotes Cl.

The compounds of the formula A are preferably selected from the following sub-formulae:

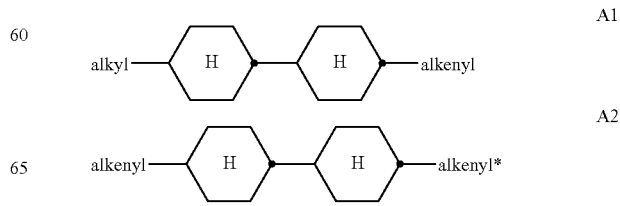

A1

A2

A3
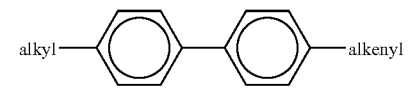
A4
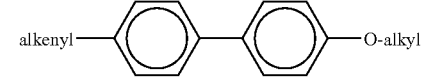
A5
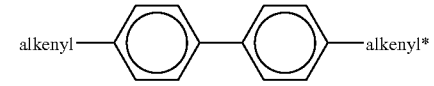
A6
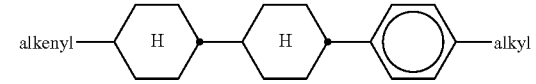
A7
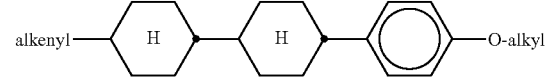
A8
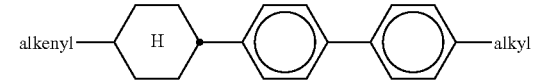
A9
A10
A11
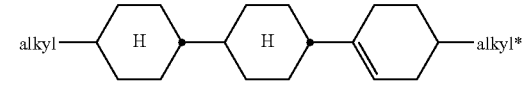
A12
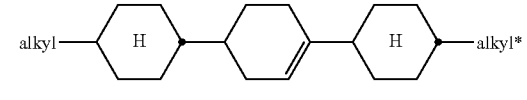
The compounds of the formula B are preferably selected from the following sub-formulae:
B1
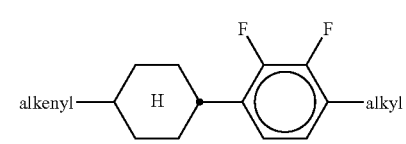
B2
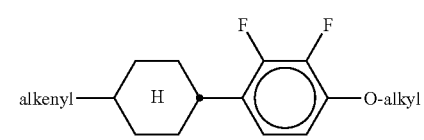
B3
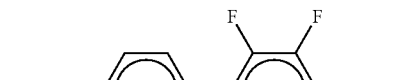
B4
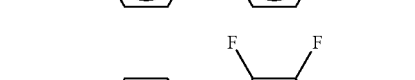
B5
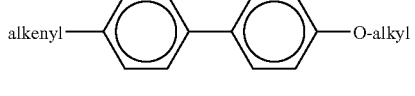
B6
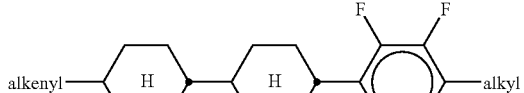
B7
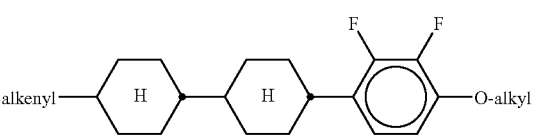
B8
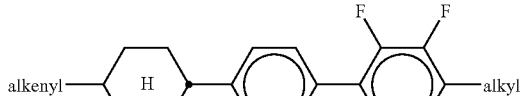
B9
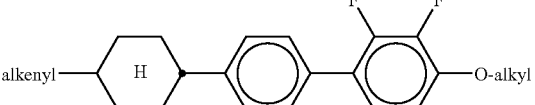
B10
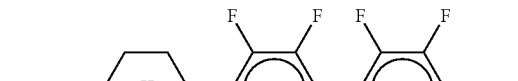
B11
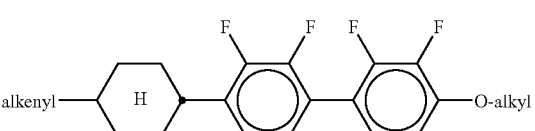
B12
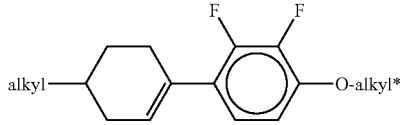
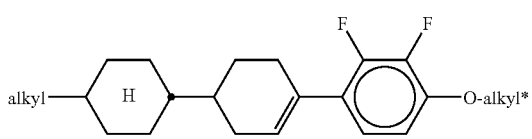
in which alkyl denotes a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particularly preferred compounds of the formula A are selected from the following sub-formulae:

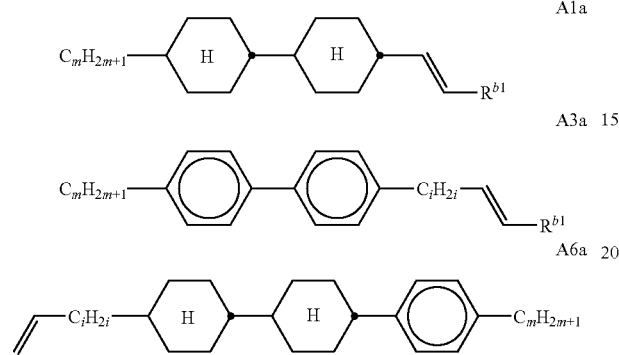

A1a

A3a

A6a

Very particularly preferred compounds of the formula B are selected from the following sub-formulae:

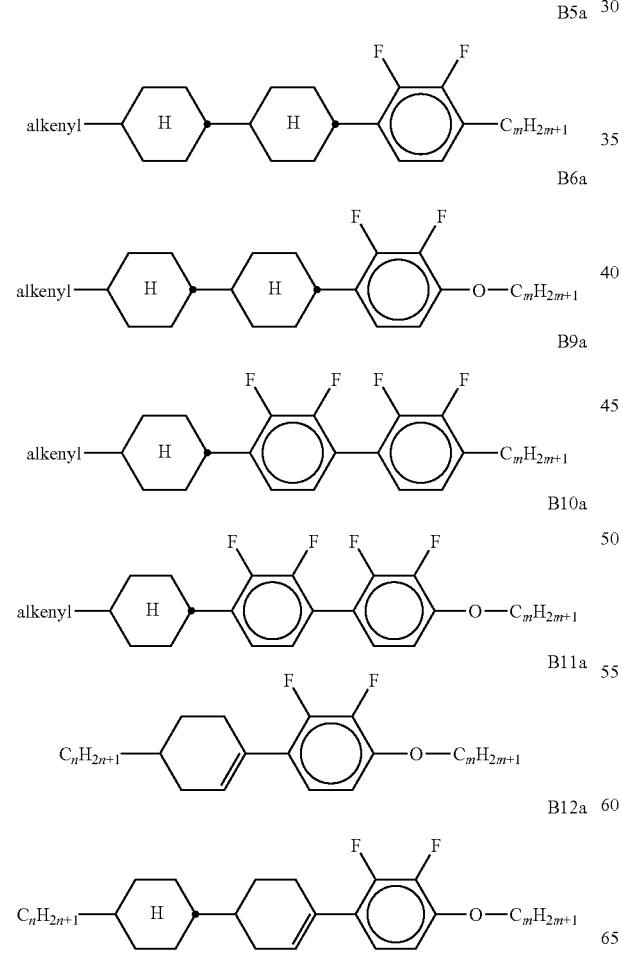

B5a

B6a

B9a

B10a

B11a

B12a in which m and n each, independently of one another, denote 1, 2, 3, 4, 5 or 6, i denotes 0, 1, 2 or 3, R$^{b1}$ denotes H, CH$_3$ or C$_2$H$_5$, and alkenyl denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

In LIQUID CRYSTALLINE media for use in PSA-OCB displays, the low-molecular-weight component preferably comprises one or more alkenyl compounds of the formula A or sub-formulae thereof as defined above.

Further particularly preferred LIQUID CRYSTALLINE host mixtures and LIQUID CRYSTALLINE media are indicated below:

a) LIQUID CRYSTALLINE medium which additionally comprises one or more compounds selected from the following formulae:

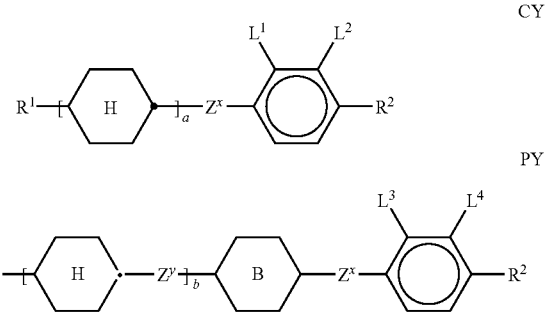

CY

PY in which the individual radicals have the following meaning:
a 1 or 2,
b 0 or 1,

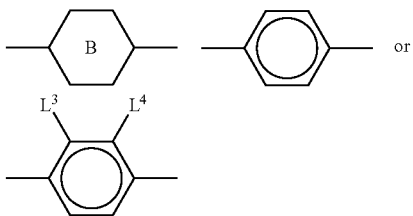

or

R$^1$ and R$^2$ each, independently of one another, alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, Z$^x$ and Z$^y$ each, independently of one another, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH—CHCH$_2$O— or a single bond, preferably a single bond, L$^{1-4}$ each, independently of one another, F, Cl, OCF$_3$, CF$_3$, CH$_3$, CH$_2$F, CHF$_2$.

Preferably, both radicals L$^1$ and L$^2$ denote F, or one of the radicals L$^1$ and L$^2$ denotes F and the other denotes Cl, or both radicals L$^3$ and L$^4$ denote F, or one of the radicals L$^3$ and L$^4$ denotes F and the other denotes Cl.

The compounds of the formula CY are preferably selected from the following sub-formulae:

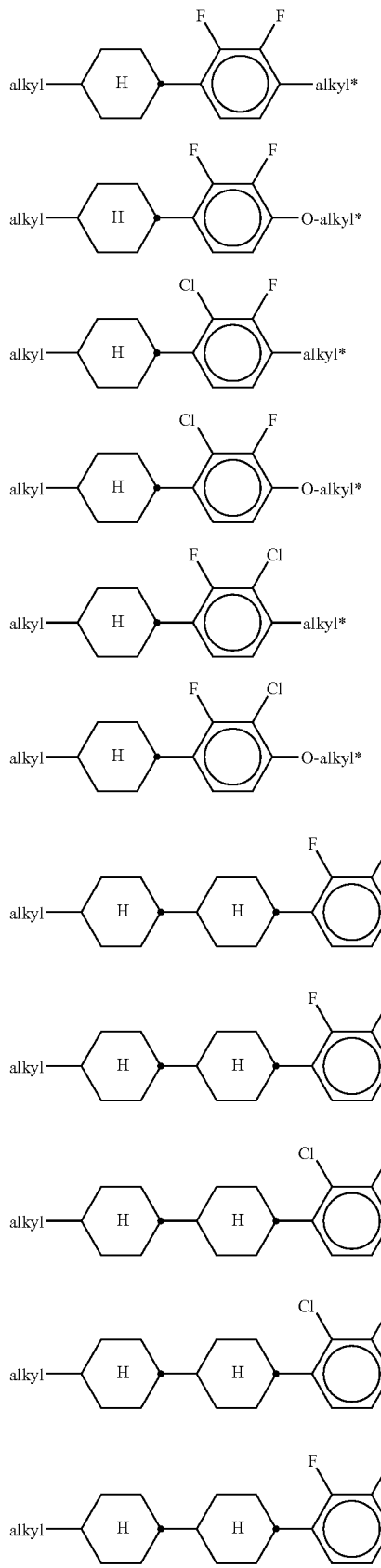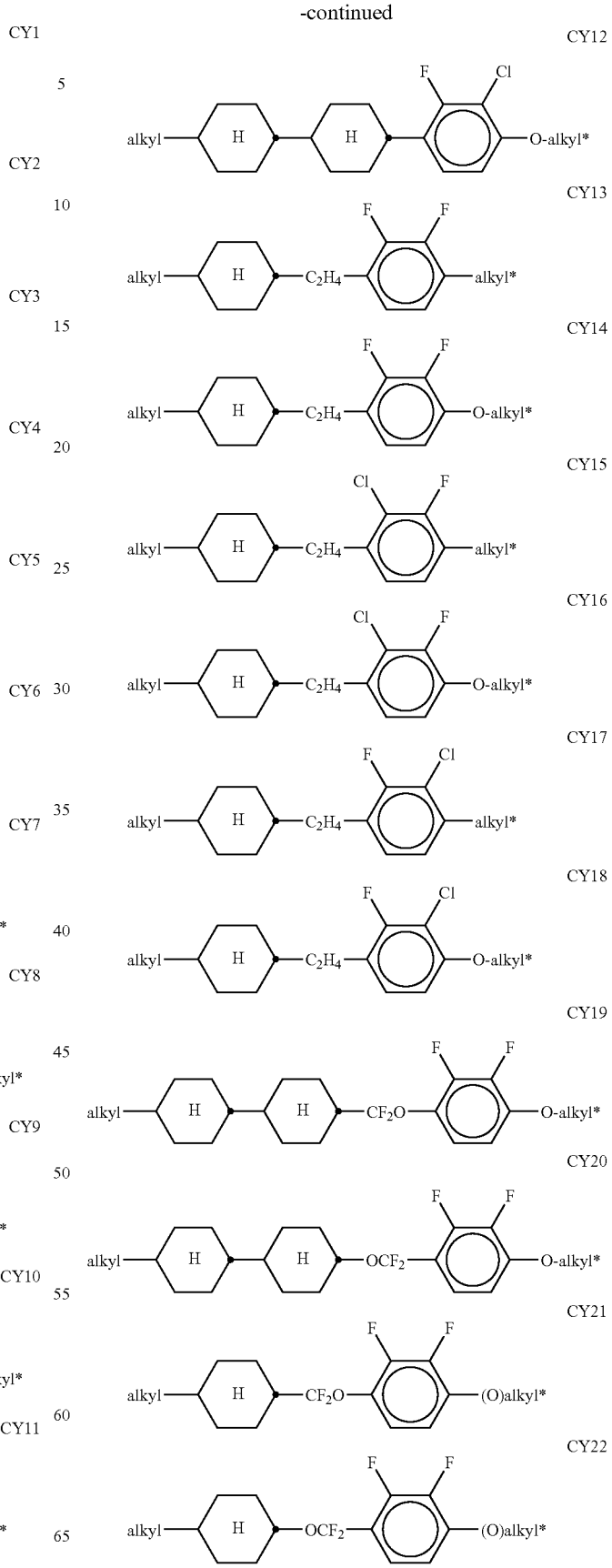

-continued

CY23
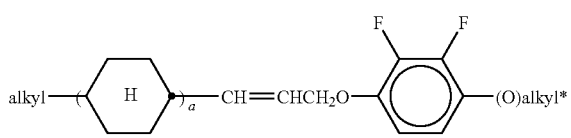

CY24
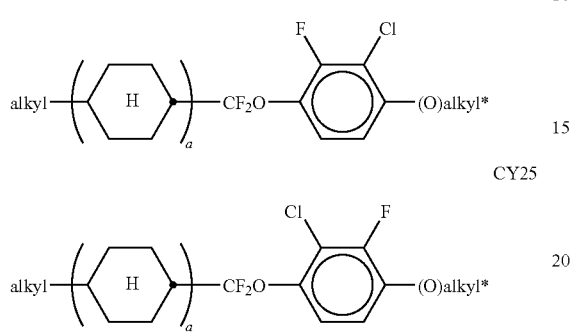

CY25 in which a denotes 1 or 2, and alkyl and alkyl* each, independently of one another, denote a straight-chain alkyl radical having 1-6 C atoms.

The compounds of the formula PY are preferably selected from the following sub-formulae:

PY1
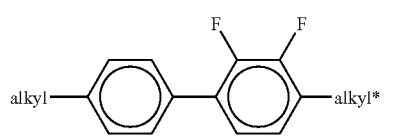

PY2

PY3
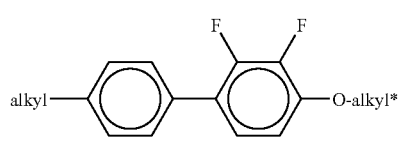

PY4

PY5
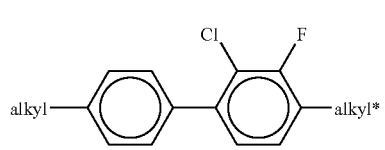

PY6
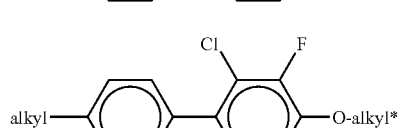

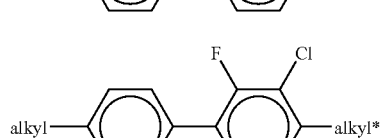

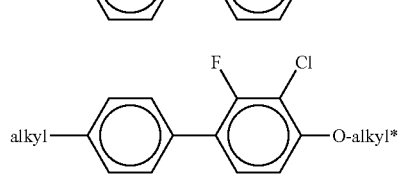

-continued

PY7
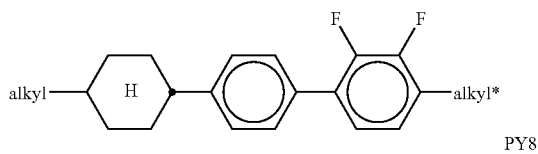

PY8

PY9
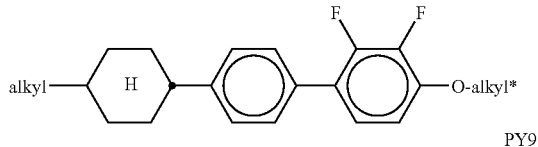

PY10

PY11
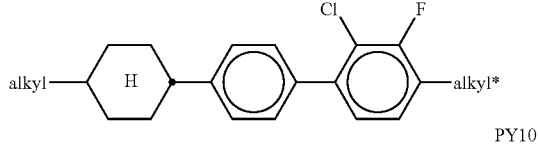

PY12
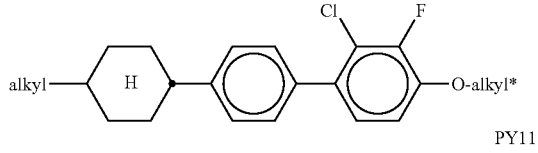

PY13
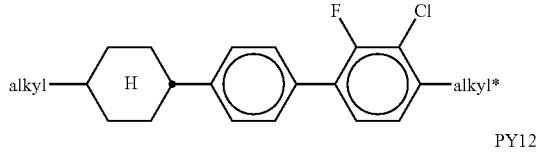

PY14
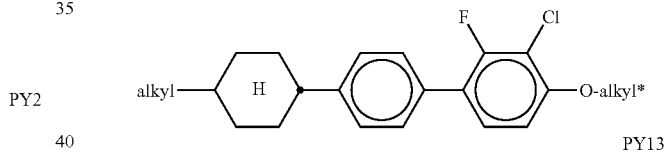

PY15
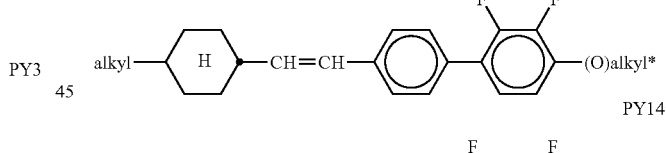

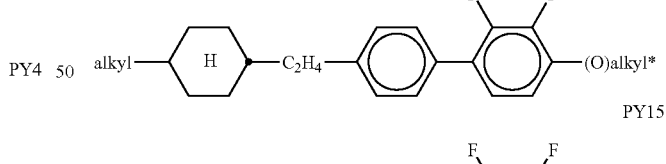

PY16
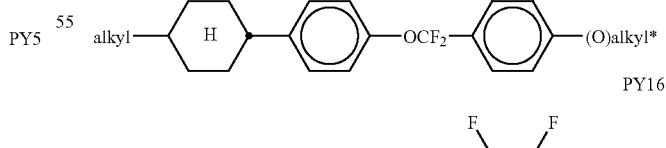

in which alkyl and alkyl* each, independently of one another, denote a straight-chain alkyl radical having 1-6 C atoms b) LIQUID CRYSTALLINE medium which additionally comprises one or more compounds of the following formula;

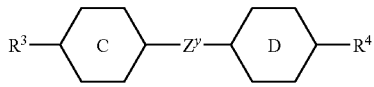

in which the individual radicals have the following meaning:

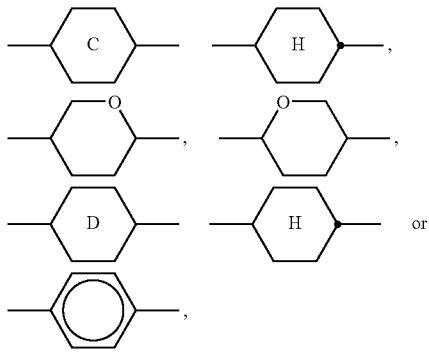

$R^3$ and $R^4$ each, independently of one another, alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^y$ —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —$CH=CHCH_2O$— or a single bond, preferably a single bond.

The compounds of the formula ZK are preferably selected from the following sub-formulae:

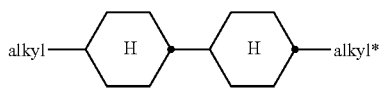

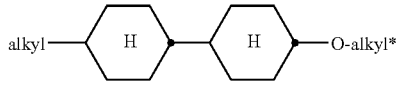

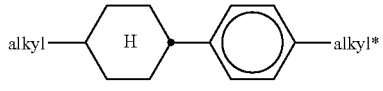

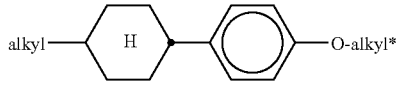

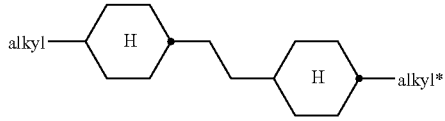

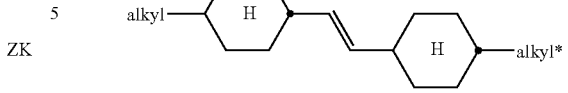

in which alkyl and alkyl* each, independently of one another, denote a straight-chain alkyl radical having 1-6 C atoms.

c) LIQUID CRYSTALLINE medium which additionally comprises one or more compounds of the following formula:

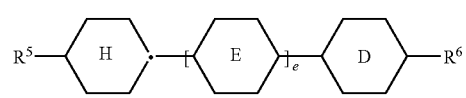

in which the individual radicals have on each occurrence, identically or differently, the following meaning:

$R^5$ and $R^6$ each, independently of one another, one of the meanings indicated above for $R^1$,

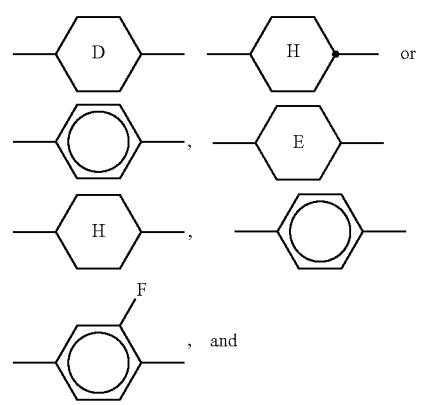

e 1 or 2.

The compounds of the formula DK are preferably selected from the following sub-formulae.

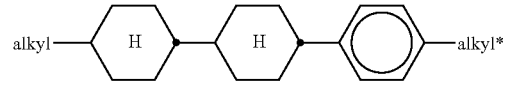

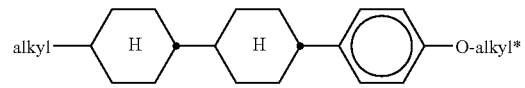

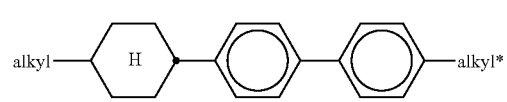

-continued

DK4
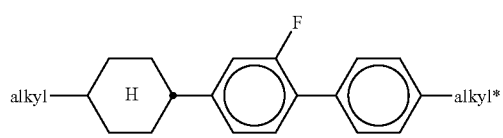

DK5
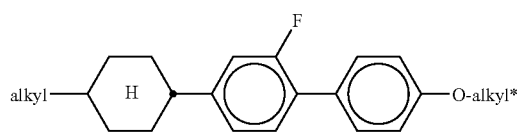

DK6
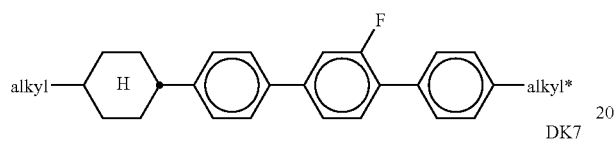

DK7
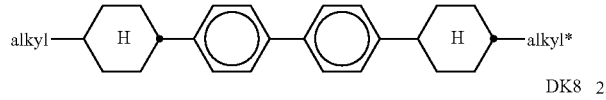

DK8

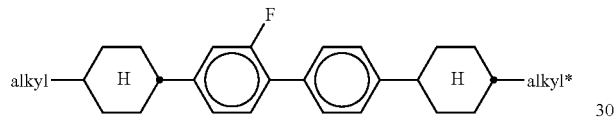

in which alkyl and alkyl* each, independently of one another, denote a straight-chain alkyl radical having 1-6 C atoms.

d) LIQUID CRYSTALLINE medium which additionally comprises one or more compounds of the following formula:

AY
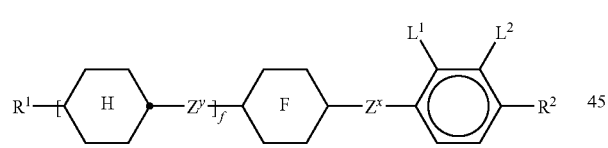

in which the individual radicals have the following meaning:

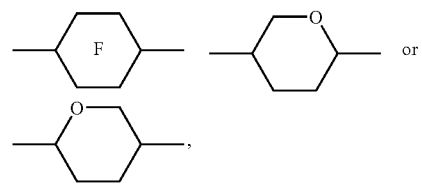 or f 0 or 1,

R$^1$ and R$^2$ each, independently of one another, alkyl having 1 to 12 C atoms, in which, in addition, one or two non-adjacent CH$_2$ groups may be replaced by —O—, —CH=H—, —CO—, —OCO— or —COO— in such a way that O atoms are not linked directly to one another, Z$^x$ and Z$^y$ each, independently of one another, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, or a single bond, preferably a single bond, L$^1$ and L$^2$ each, independently of one another, F, Cl, OCF$_3$, CF$_3$, CH$_3$, CH$_2$F, CHF$_2$.

Preferably, both radicals L$^1$ and L$^2$ denote F, or one of the radicals L$^1$ and L$^2$ denotes F and the other denotes Cl.

The compounds of the formula AY are preferably selected from the following sub-formulae:

AY1
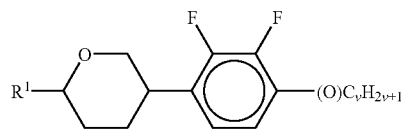

AY2
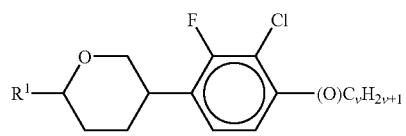

AY3
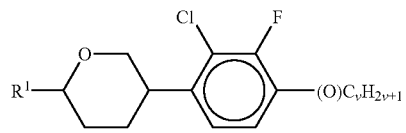

AY4
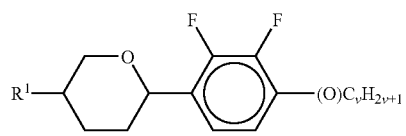

AY5
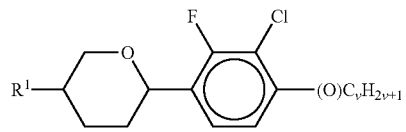

AY6
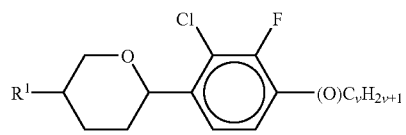

AY7
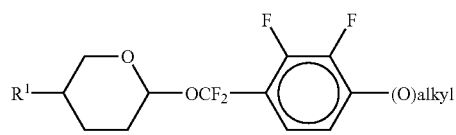

AY8
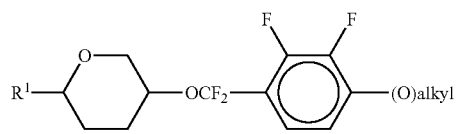

AY9
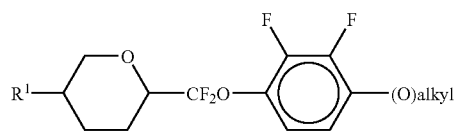

AY10

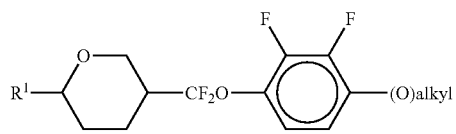

in which R¹ has the meaning indicated above, and v denotes an integer from 1 to 6. R¹ preferably denotes straight-chain alkyl, in particular $CH_3$, $C_2H_5$, n-$C_3H_7$, n-$C_4H_9$, n-$C_5H_{11}$.

e) LIQUID CRYSTALLINE medium which additionally comprises one or more compounds selected from the following formulae:

G1

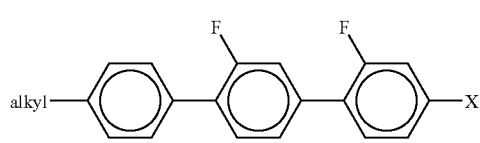

G1

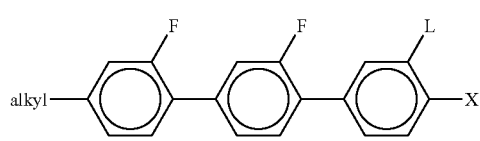

G3

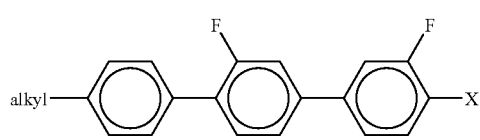

G4

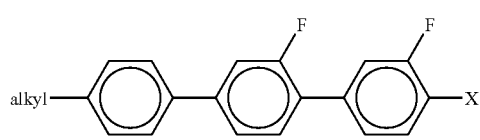

in which alkyl denotes $C_{1-6}$-alkyl, L denotes H or F, and X denotes F, Cl, $OCF_3$, $OCHF_2$ or $OCH=CF_2$. Particular preference is given to compounds of the formula G1 in which X denotes F.

f) LIQUID CRYSTALLINE medium which additionally comprises one or more compounds selected from the following formulae:

Y1

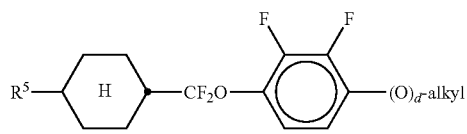

Y2

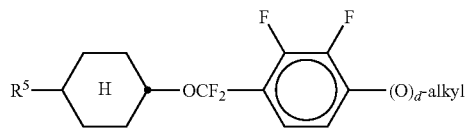

Y3

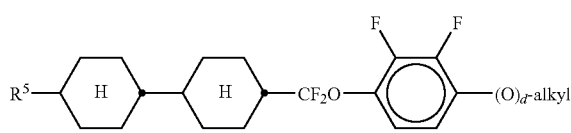

Y4

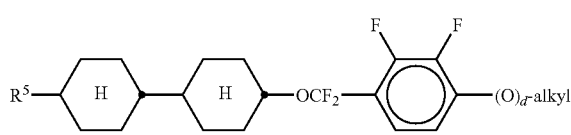

Y5

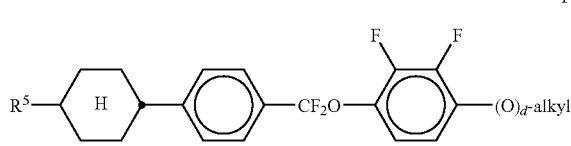

Y6

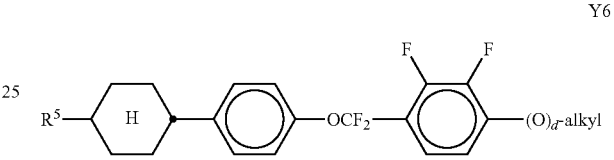

Y7

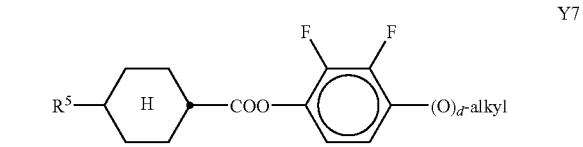

Y8

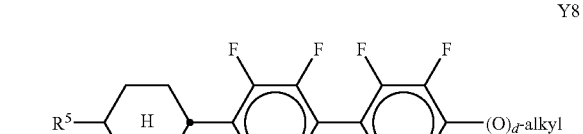

Y9

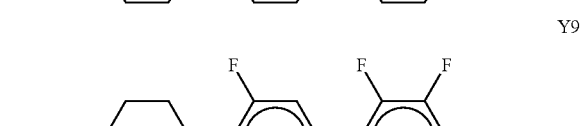

Y10

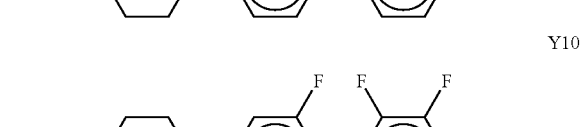

Y11

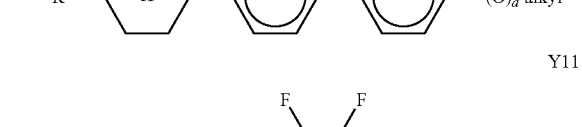

Y12

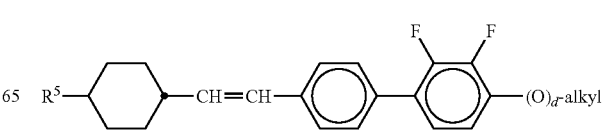

-continued

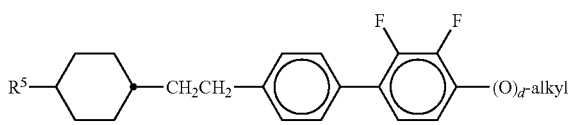
Y13

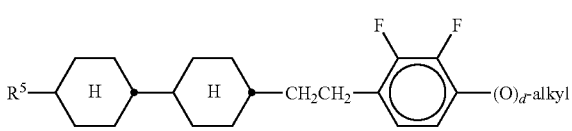
Y14 in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy, d is preferably 1. The LIQUID CRYSTALLINE medium according to the invention preferably comprises one or more compounds of the abovementioned formulae in amounts of $\geqq 5\%$ by weight.

g) LIQUID CRYSTALLINE medium which additionally comprises one or more biphenyl compounds of the following formula:

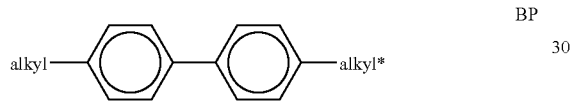
BP in which alkyl and alkyl* each, independently of one another, denote a straight-chain alkyl radical having 1-6 C atoms h) LIQUID CRYSTALLINE medium which additionally comprises one or more terphenyl compounds of the following formula:

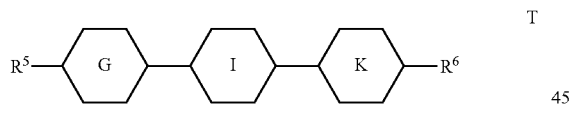
T in which $R^5$ and $R^6$ each, independently of one another, have one of the meanings indicated above for $R^1$, and

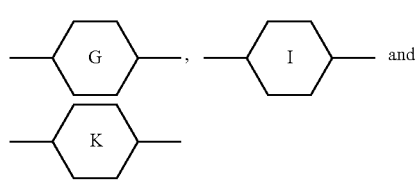

each, independently of one another, denote

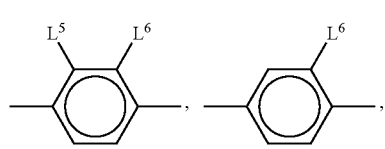

-continued

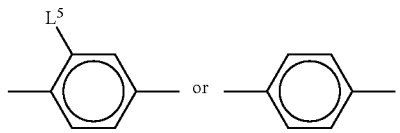

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the following sub-formulae:

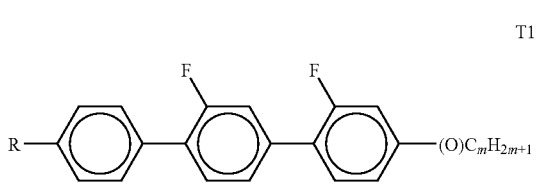
T1

T2

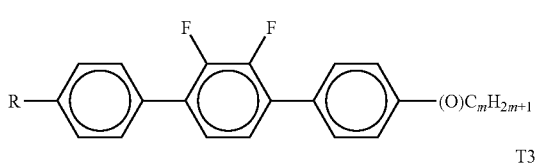
T3

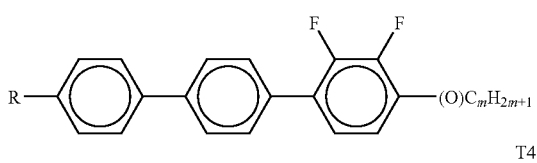
T4

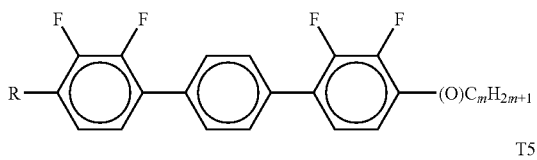
T5

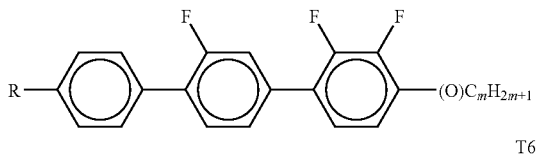
T6

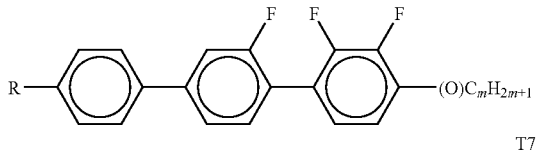
T7

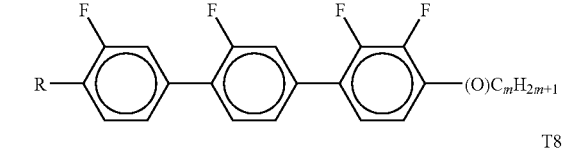
T8

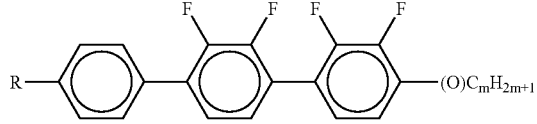

in which R denotes a straight-chain alkyl or alkoxy radical having 1-7 C atoms, R* denotes a straight-chain alkenyl radical having 2-7 C atoms, and m denotes an integer from 1 to 6 R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LIQUID CRYSTALLINE medium according to the invention preferably comprises the terphenyls of the formula T and preferred sub-formulae thereof in an amount of 2-30% by weight, in particular 5-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≧0.1. Preferred mixtures comprise 2-20% by weight of one or more terphenyl compounds of the formula T, preferably selected from the group of the compounds T1 to T22.

i) LIQUID CRYSTALLINE medium which additionally comprises one or more compounds of the following formulae:

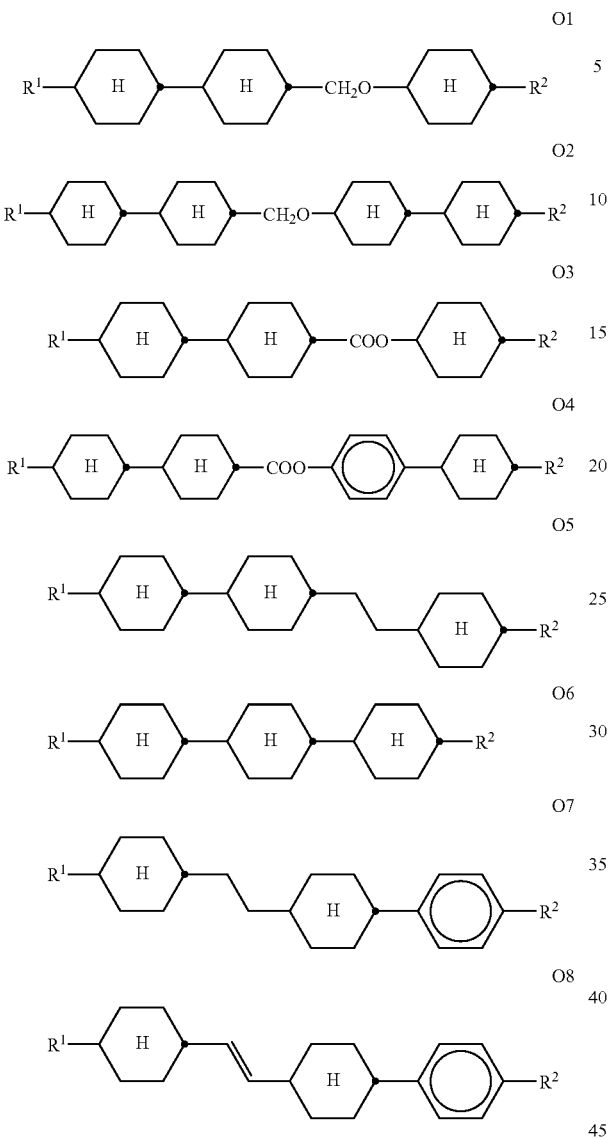

in which $R^1$ and $R^2$ have the meanings indicated above and preferably each, independently of one another, denote straight-chain alkyl or alkoxy.

Preferred media comprise one or more compounds selected from the formulae O1, O3 and O4.

k) LIQUID CRYSTALLINE medium which additionally comprises one or more compounds of the following formula:

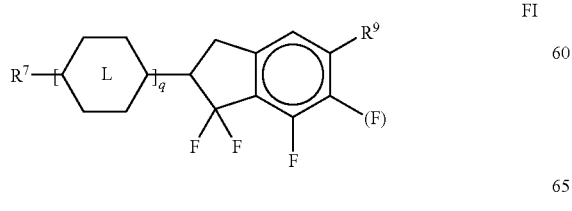

in which

denotes

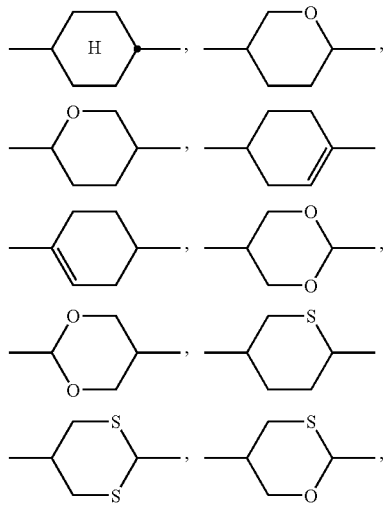

$R^9$ denotes H, $CH_3$, $C_2H_5$ or n-$C_3H_7$, and q denotes 1, 2 or 3, and $R^7$ has one of the meanings indicated for $R^1$, preferably in amounts of >3% by weight, in particular $\geqq$5% by weight and very particularly preferably 5-30% by weight.

Particularly preferred compounds of the formula IF are selected from the following sub-formulae:

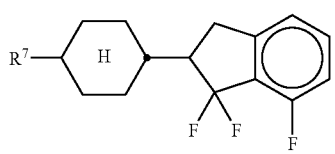

FI1

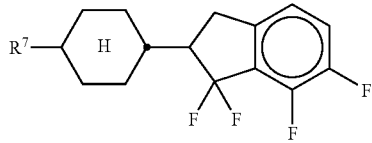

FI2

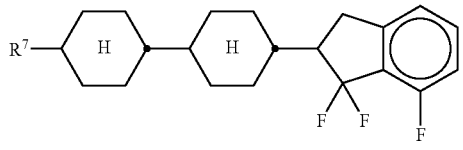

FI3

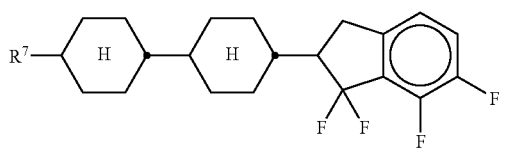

FI4

-continued

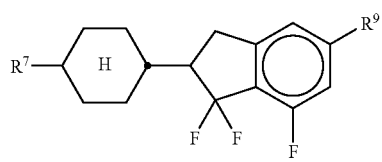
FI5

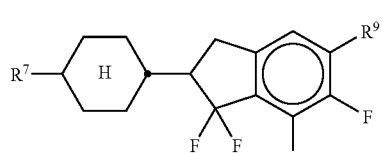
FI6

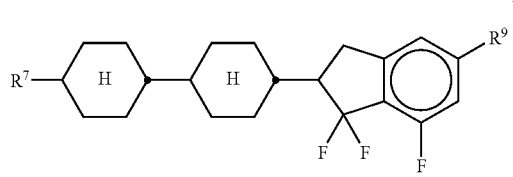
FI7

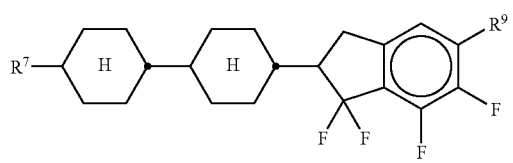
FI8 in which R⁷ preferably denotes straight-chain alkyl, and R⁹ denotes $CH_3$, $C_2H_5$ or n-$C_3H_7$. Particular preference is given to the compounds of the formulae FI1, FI2 and IF3.

m) LIQUID CRYSTALLINE medium which additionally comprises one or more compounds of the following formulae:

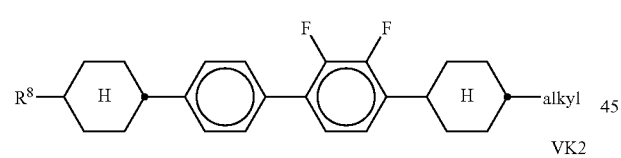
VK1

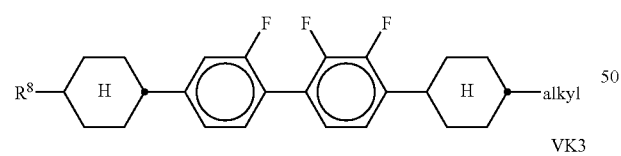
VK2

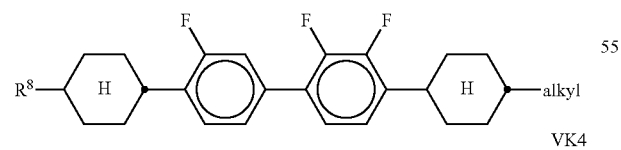
VK3

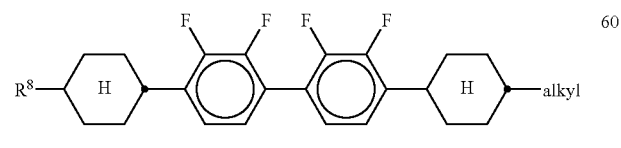
VK4 in which R⁸ has the meaning indicated for R¹, and alkyl denotes a straight-chain alkyl radical having 1-6 C atoms.

n) LIQUID CRYSTALLINE medium which additionally comprises one or more compounds which contain a tetrahydronaphthyl or naphthyl unit, such as, for example, the compounds selected from the following formulae:

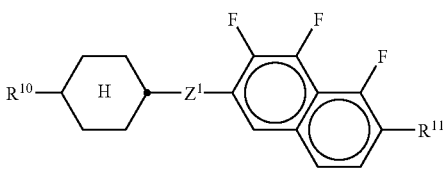
N1

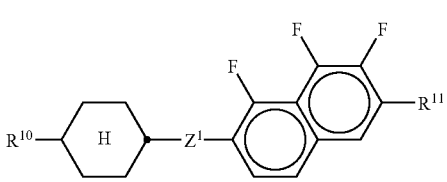
N2

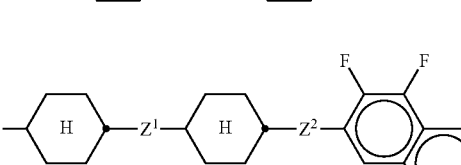
N3

N4

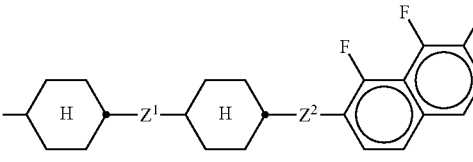
N5

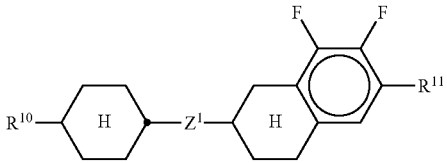
N6

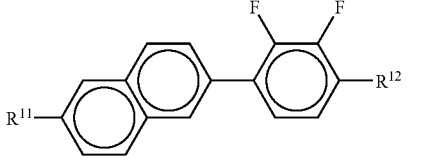
N7

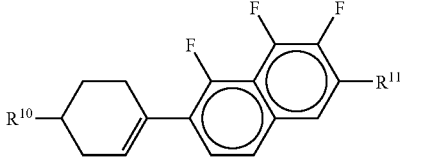
N8

N9

![N9 structure]

N10

![N10 structure]

in which $R^{10}$ and $R^{11}$ each, independently of one another, have one of the meanings indicated for $R^1$, preferably denote straight-chain alkyl, straight-chain alkoxy or straight-chain alkenyl, and Z, $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

o) LIQUID CRYSTALLINE medium which additionally comprises one or more difluorodibenzochromans and/or chromans of the following formulae:

BC

![BC structure with R^11 and R^12]

CR

![CR structure with R^11 and R^12, c = 0 or 1]

in which $R^{11}$ and $R^{12}$ each, independently of one another, have the meaning indicated above, and c denotes 0 or 1, preferably in amounts of 3 to 20% by weight, in particular in amounts of 3 to 15% by weight.

Particularly preferred compounds of the formulae BC and CR are selected from the following sub-formulae:

BC1

![BC1: alkyl-...-alkyl*]

BC2

![BC2: alkyl-O-...-alkyl*]

BC3

![BC3: alkyl-O-...-O-alkyl*]

BC4

![BC4: alkyl-...-O-alkyl*]

BC5

![BC5: alkenyl-...-alkenyl*]

BC6

![BC6: alkyl-...-alkenyl]

BC7

![BC7: alkenyl-...-alkyl]

CR1

![CR1: alkyl-H-...-alkyl*]

CR2

![CR2: alkyl-O-H-...-alkyl*]

CR3

![CR3: alkyl-H-H-...-alkyl*]

CR4

![CR4: alkyl-O-H-H-...-alkyl*]

CR5

![CR5: alkenyl-H-H-...-alkyl*]

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms Alkenyl and alkenyl* preferably denote CH$_2$=CH—, CH$_3$CH=CH—, CH$_2$=CHCH$_2$CH$_2$—, CH$_3$CH=CHC$_2$H$_4$— or C$_3$H$_7$CH=CH—.

Very particular preference is given to mixtures comprising one, two or three compounds of the formula BC-2.

p) LIQUID CRYSTALLINE medium which additionally comprises one or more fluorinated phenanthrenes or dibenzofurans of the following formulae:

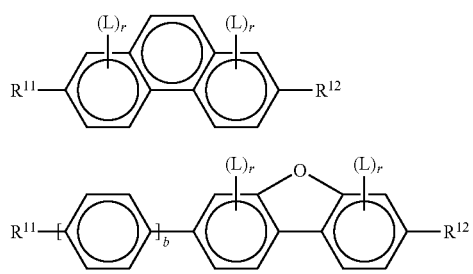

PH

BF in which R$^{11}$ and R$^{12}$ each, independently of one another, have the meanings indicated above, b denotes 0 or 1, L denotes F, and r denotes 1, 2 or 3.

Particularly preferred compounds of the formulae PH and BF are selected from the following sub-formulae:

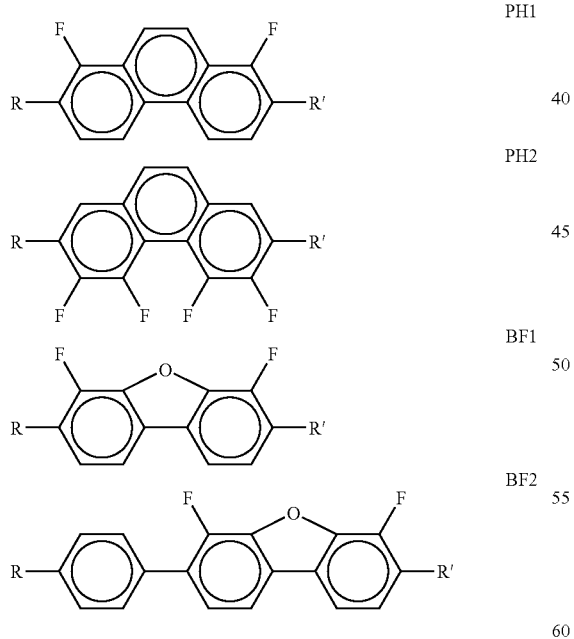

PH1

PH2

BF1

BF2 in which R and R' each, independently of one another, denote a straight-chain alkyl or alkoxy radical having 1-7 C atoms.

q) LIQUID CRYSTALLINE medium, preferably for use in PSA-OCB displays, which comprises one or more compounds of the following formulae:

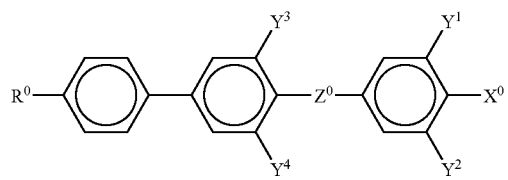

AA

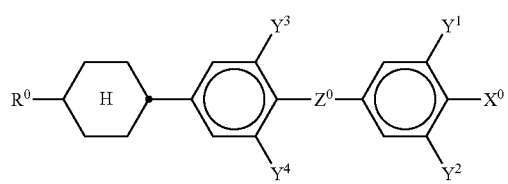

BB

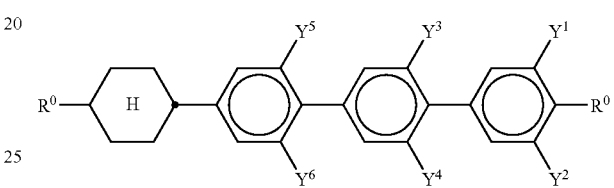

CC in which

R$^0$ on each occurrence, identically or differently, denotes n-alkyl, alkoxy, oxaalkyl, fluoroalkyl or alkenyl, each having up to 9 C atoms, X$^0$ denotes F, Cl or in each case halogenated alkyl, alkenyl, alkenyloxy or alkoxy, each having up to 6 C atoms, Z$^0$ denotes —CF$_2$O— or a single bond, Y$^{1-6}$ each, independently of one another, denote H or F.

X$^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH=CF$_2$, particularly preferably F or OCF$_3$.

The compounds of the formula M are preferably selected from the following formulae:

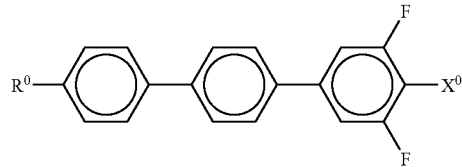

AA1

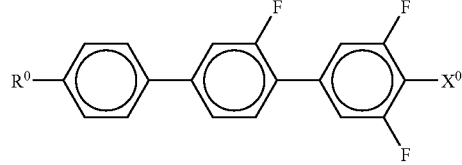

AA2

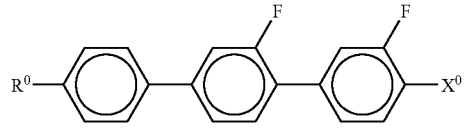

AA3

-continued

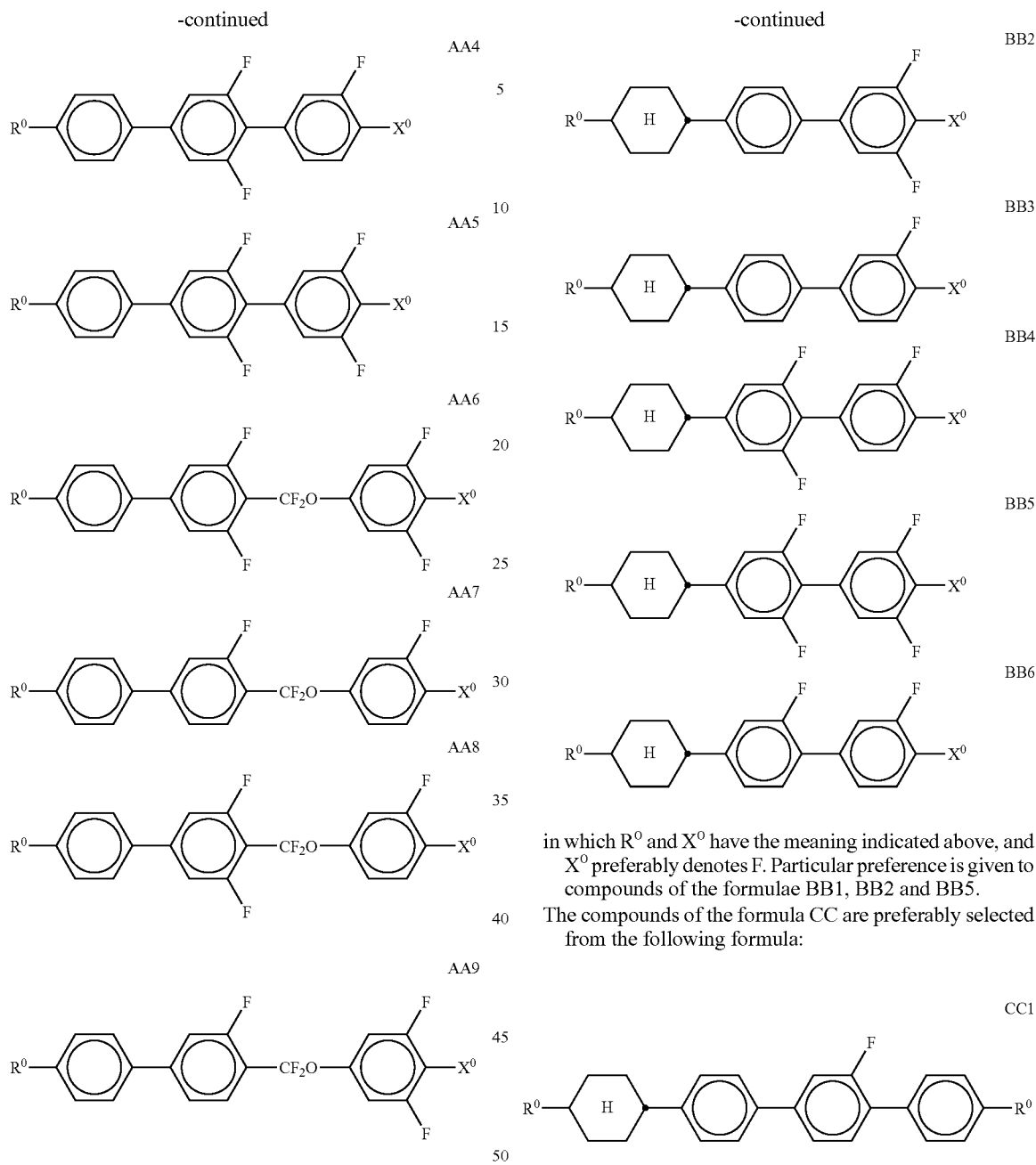

in which R⁰ and X⁰ have the meaning indicated above, and X⁰ preferably denotes F. Particular preference is given to compounds of the formulae AA2 and AA6.

The compounds of the formula BB are preferably selected from the following formulae;

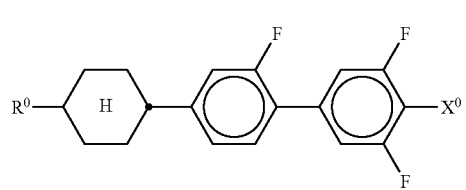

in which R⁰ and X⁰ have the meaning indicated above, and X⁰ preferably denotes F. Particular preference is given to compounds of the formulae BB1, BB2 and BB5.

The compounds of the formula CC are preferably selected from the following formula:

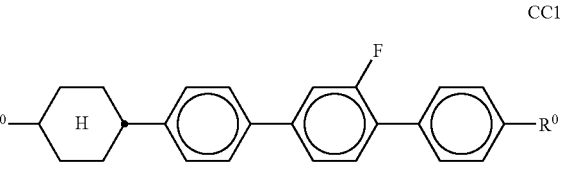

in which R⁰ has on each occurrence, identically or differently, the meaning indicated above and preferably denotes alkyl having 1 to 6 C atoms.

r) LIQUID CRYSTALLINE medium which comprises 1 to 5, preferably 1, 2 or 3, polymerizable compounds.

s) LIQUID CRYSTALLINE medium in which the proportion of polymerizable compounds in the mixture as a whole is 0.05 to 5%, preferably 0.1 to 1%.

t) LIQUID CRYSTALLINE medium which comprises 1 to 8, preferably 1 to 5, compounds of the formula A and/or B, particularly preferably selected from the formulae A1, A2, A3, A6, B5, B6, B9 and B10. The proportion of these compounds in the mixture as a whole is preferably 5 to 70%, particularly preferably 10 to 40%. The content of these individual compounds is preferably in each case 2 to 60%, particularly preferably 2 to 40%.

u) LIQUID CRYSTALLINE medium which comprises 1 to 8, preferably 1 to 5, compounds selected from the formulae CY2, CY14 and PY2. The proportion of these compounds in the mixture as a whole is preferably 5 to 60%, particularly preferably 10 to 35%. The content of these individual compounds is preferably in each case 2 to 20%.

v) LIQUID CRYSTALLINE medium which comprises 1 to 8, preferably 1 to 5, compounds selected from the formulae CY8, PY8 and B10. The proportion of these compounds in the mixture as a whole is preferably 5 to 60%, particularly preferably 10 to 35%. The content of these individual compounds is preferably in each case 2 to 20%.

w) LIQUID CRYSTALLINE medium which comprises 1 to 8, preferably 1 to 5, compounds selected from the formulae CY9, PY7 and T2. The proportion of these compounds in the mixture as a whole is preferably 5 to 50%, particularly preferably 10 to 25%. The content of these individual compounds is preferably in each case 2 to 20%.

x) LIQUID CRYSTALLINE medium which comprises 1 to 10, preferably 1 to 8, compounds selected from the formulae ZK1, ZK2, ZK3, ZK4, T1 and O1. The proportion of these compounds in the mixture as a whole is preferably 3 to 45%, particularly preferably 5 to 35%. The content of these individual compounds is preferably in each case 2 to 15%.

y) LIQUID CRYSTALLINE medium in which the proportion of compounds of the formulae CY, PY and ZK in the mixture as a whole is greater than 50%, preferably greater than 60%.

z) LIQUID CRYSTALLINE medium which comprises one or more compounds selected from the formulae F1, N1-N10, CR and PH. The proportion of these compounds in the mixture as a whole is preferably 2 to 30%. The content of these individual compounds is preferably in each case 1 to 15%.

The combination of compounds of the preferred embodiments a)-z) mentioned above with the polymerized compounds described above effects low threshold voltages, low rotational viscosities and very good low-temperature stabilities with maintenance of high clearing points and high HR values in the LIQUID CRYSTALLINE media according to the invention and allows a pretilt angle to be set in PS(A) displays. In particular, the LIQUID CRYSTALLINE media exhibit significantly shortened response times, in particular also the grey-shade response times, in PS(A) displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LIQUID CRYSTALLINE media according to the invention for use in displays of the VA type have a negative dielectric anisotropy $\Delta\epsilon$, preferably of about −0.5 to −7.5, in particular of about −2.5 to −5.5, at 20° C. and 1 kHz.

LIQUID CRYSTALLINE media according to the invention for use in displays of the OCB type have a positive dielectric anisotropy $\Delta\epsilon$, preferably of about +7 to +17 at 20° C. and 1 kHz.

The birefringence $\Delta n$ in LIQUID CRYSTALLINE media according to the invention for use in displays of the VA type is preferably less than 0.16, particularly preferably between 0.06 and 0.14, in particular between 0.07 and 0.12.

The birefringence $\Delta n$ in LIQUID CRYSTALLINE media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyidodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), may be added in order to improve the conductivity, or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LIQUID CRYSTALLINE media according to the invention are either known or the ways in which they are prepared can readily be derived from the prior art by the person skilled in the relevant art since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LIQUID CRYSTALLINE media which can be used in accordance with the invention are prepared in a manner conventional per se, for example by mixing one or more of the above-mentioned compounds with one or more polymerizable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LIQUID CRYSTALLINE media according to the invention.

It goes without saying to the person skilled in the art that the LIQUID CRYSTALLINE media according to the invention may also comprise compounds in which, for example, H, N, O, Cl, F have been replaced by the corresponding isotopes.

The construction of the LIQUID CRYSTALLINE displays according to the invention corresponds to the conventional geometry for PS(A) displays, as described in the prior art cited at the outset. Geometries without protrusions are preferred, in particular those in which, in addition, the electrode on the colour filter side is unstructured and only the electrode on the TFT side has slits. Particularly suitable and preferred electrode structures for PSA-VA displays are described, for example, in US 2006/0066793 A1.

The following examples explain the present invention without limiting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:

(n, m, z: each, independently of one another, 1, 2, 3, 4, 5 or 6)

TABLE A
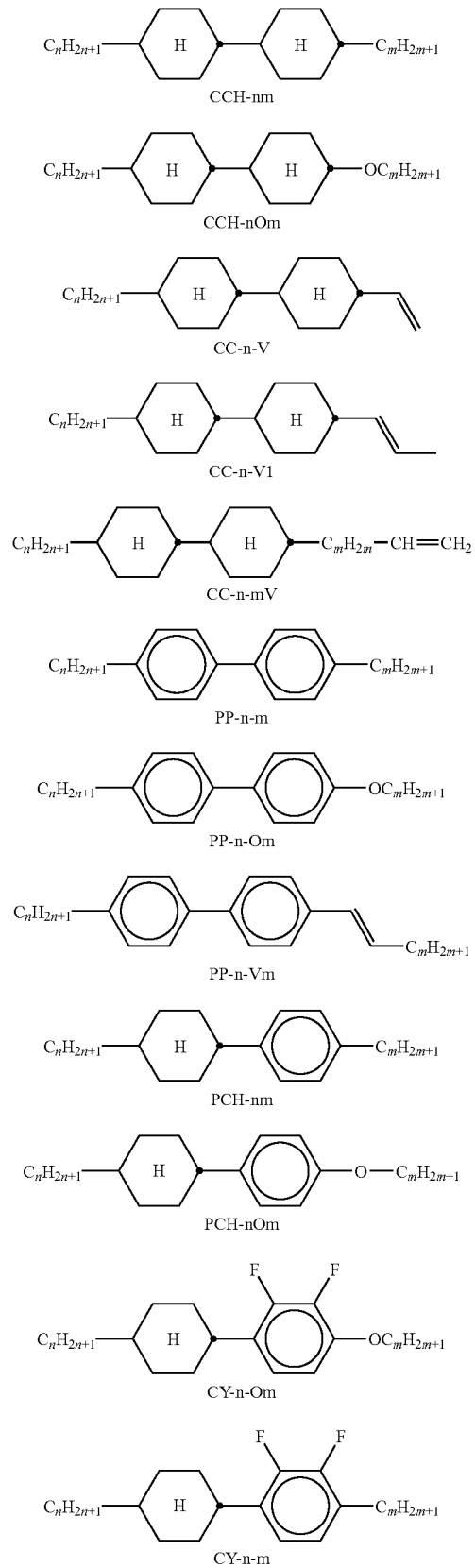

TABLE A-continued
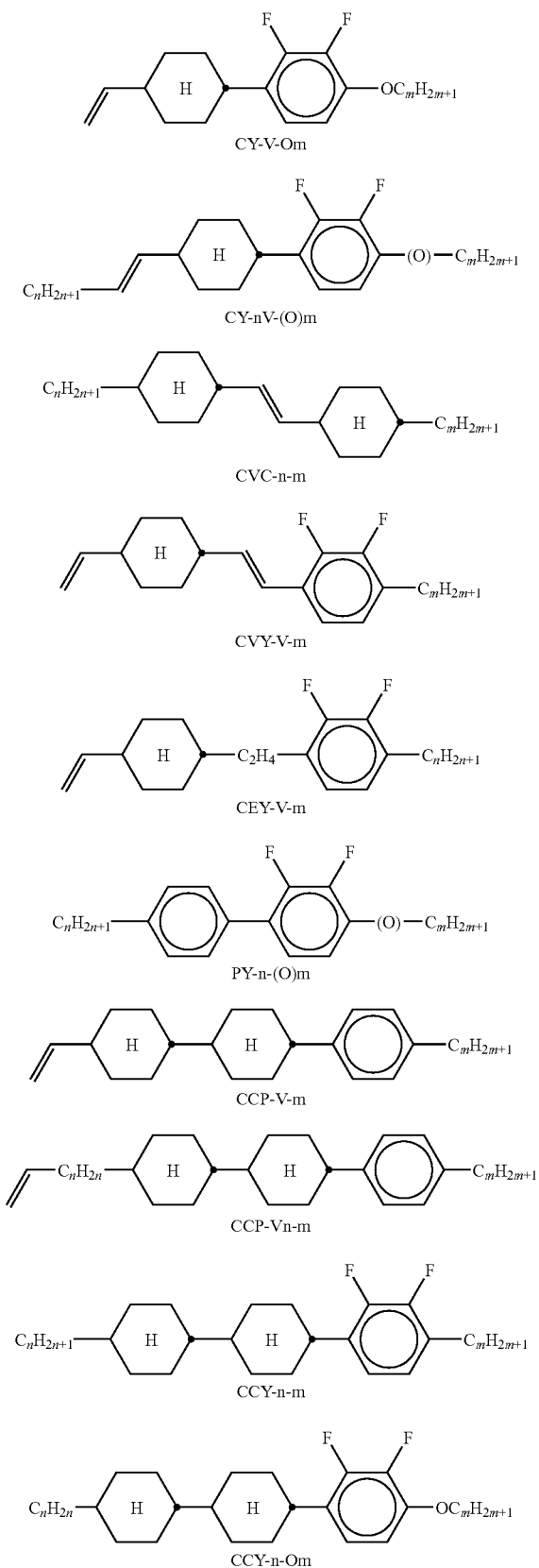

TABLE A-continued
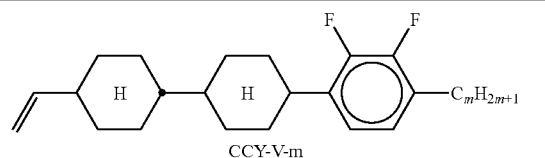
CCY-V-m
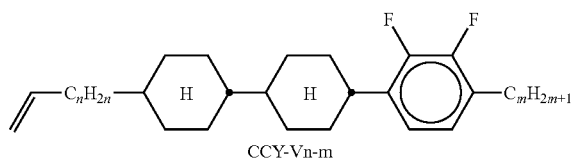
CCY-Vn-m
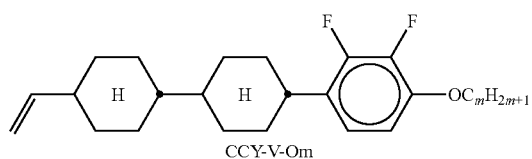
CCY-V-Om
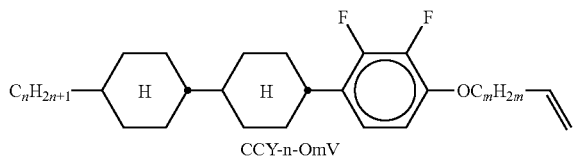
CCY-n-OmV
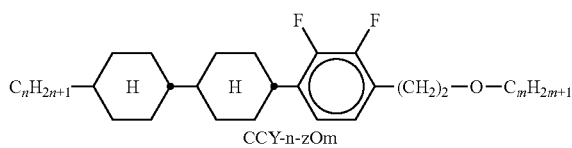
CCY-n-zOm
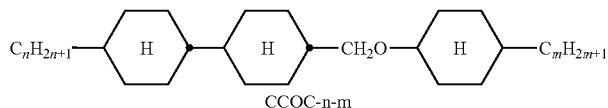
CCOC-n-m
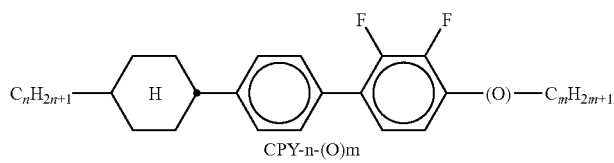
CPY-n-(O)m
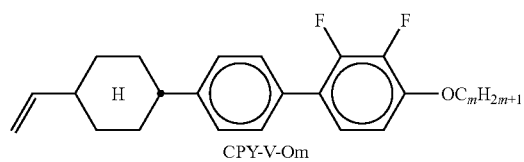
CPY-V-Om
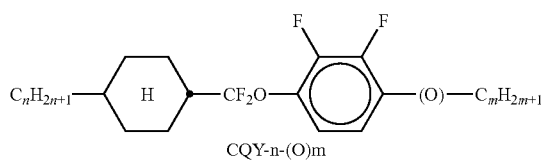
CQY-n-(O)m
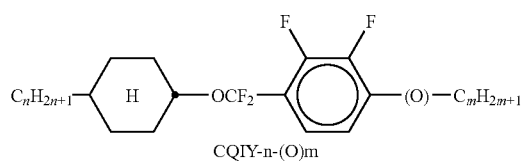
CQIY-n-(O)m TABLE A-continued
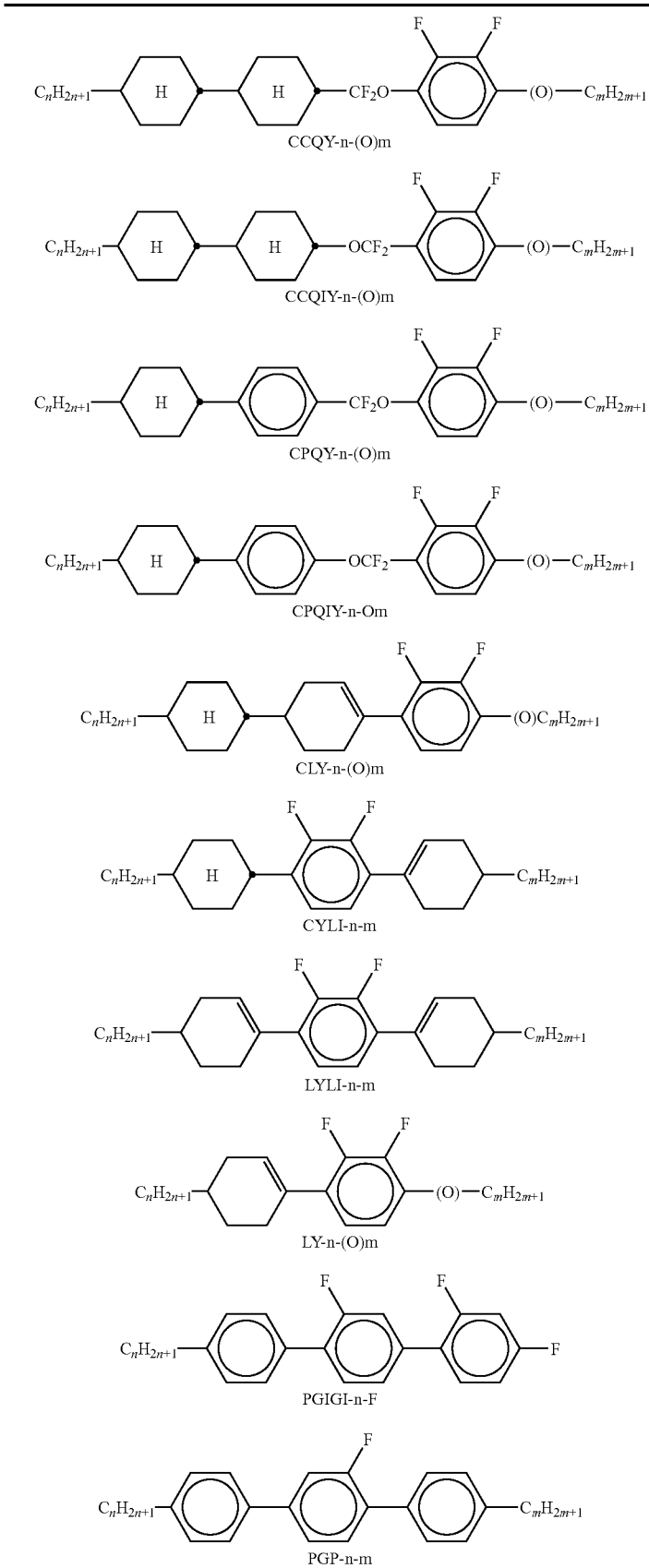

TABLE A-continued
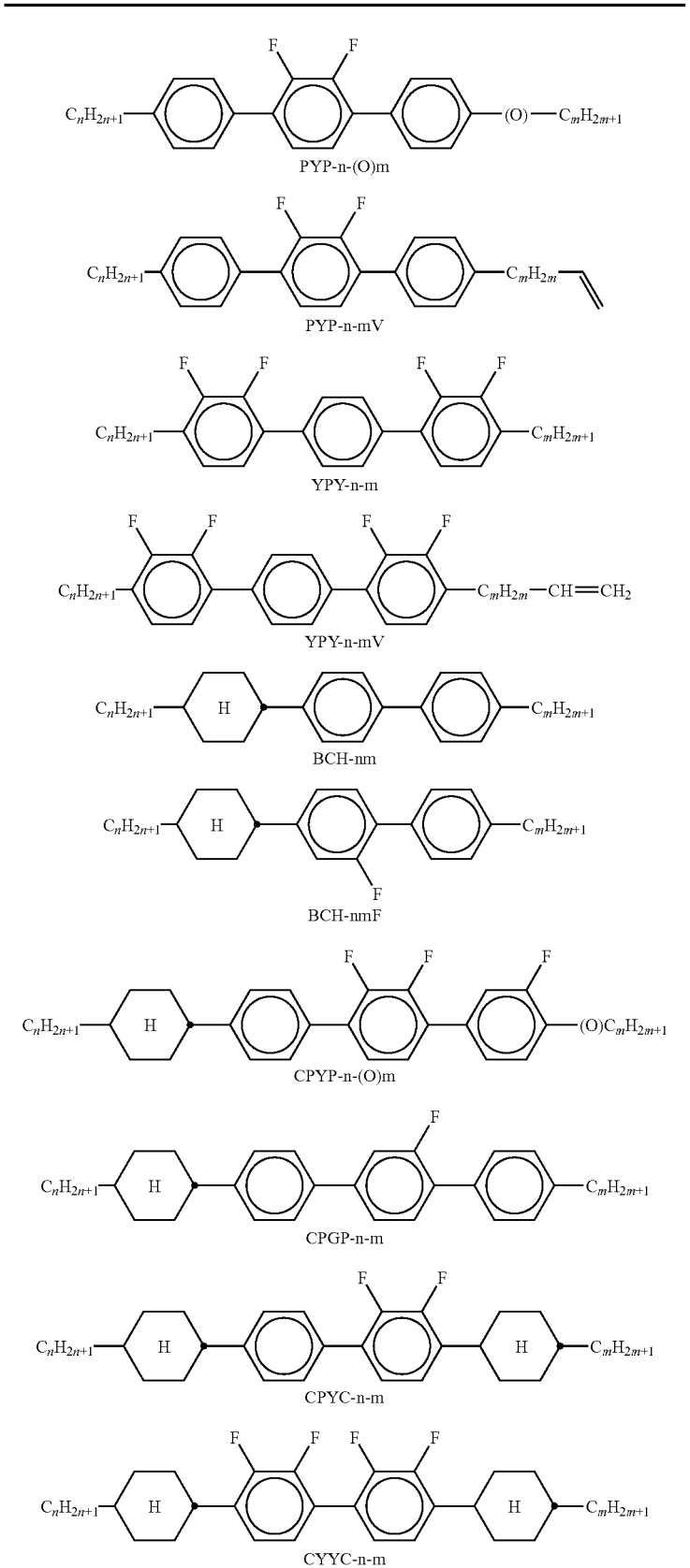

TABLE A-continued
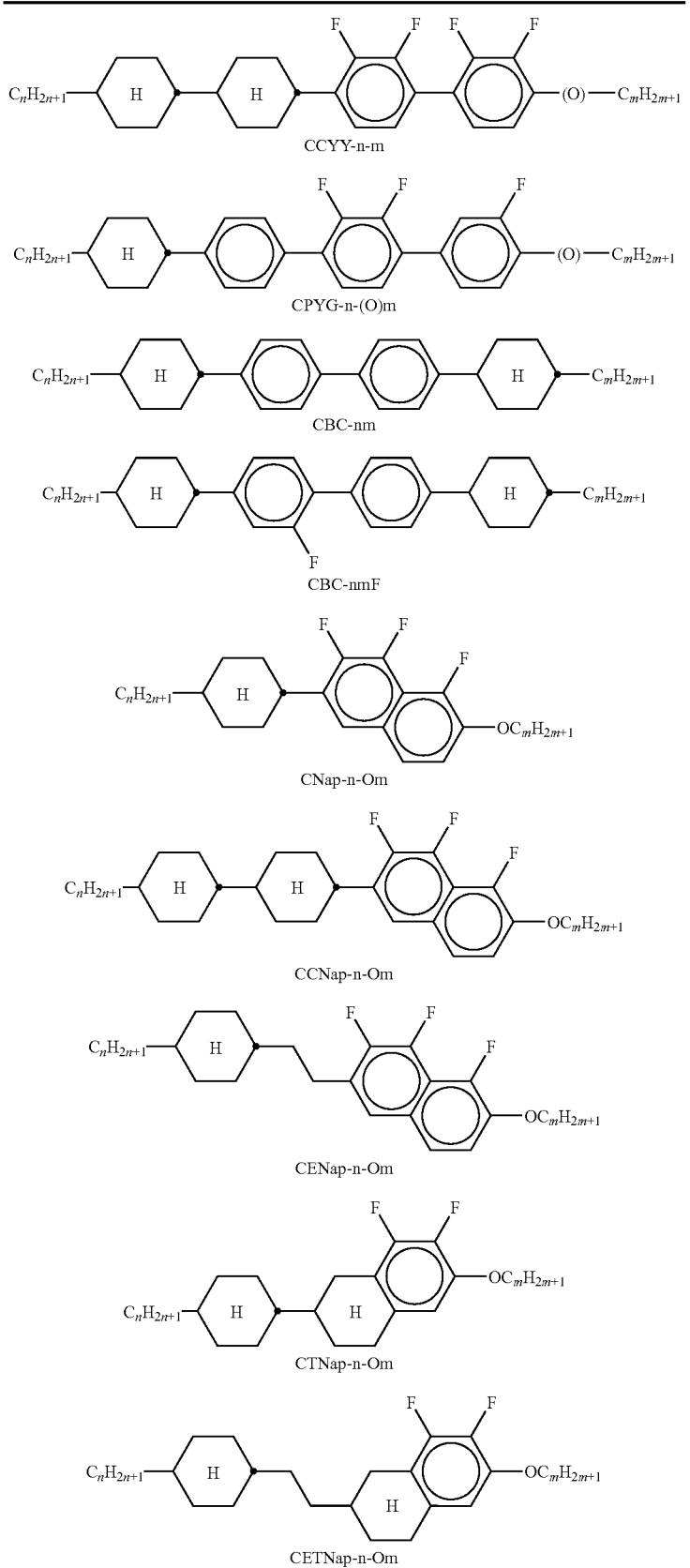

TABLE A-continued

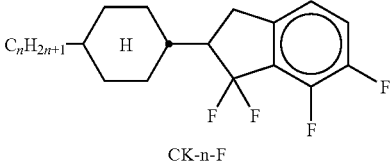

CK-n-F

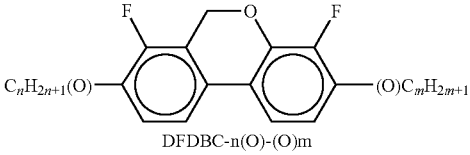

DFDBC-n(O)-(O)m

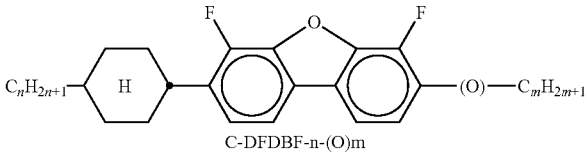

C-DFDBF-n-(O)m

In a preferred embodiment of the present invention, the LIQUID CRYSTALLINE media according to the invention comprise one or more compounds selected from the group consisting of compounds from Table A.

TABLE B

Table B indicates possible dopants which can be added to the LIQUID CRYSTALLINE media according to the invention.

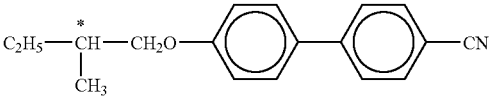

C 15

CB 15

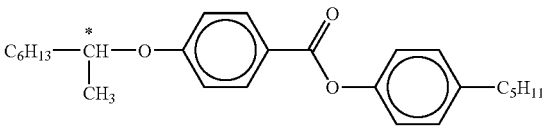

CM 21

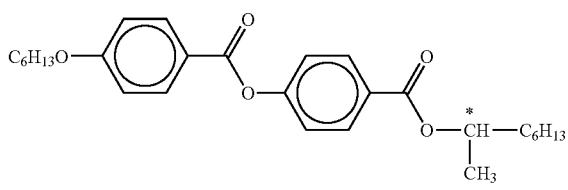

R/S-811

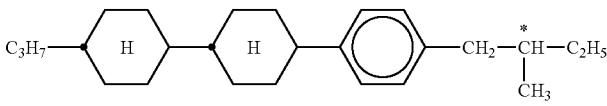

CM 44

TABLE B-continued
Table B indicates possible dopants which can be added to the LIQUID CRYSTALLINE media according to the invention.
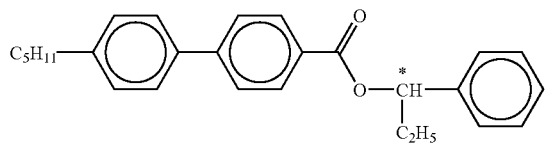
CM 45
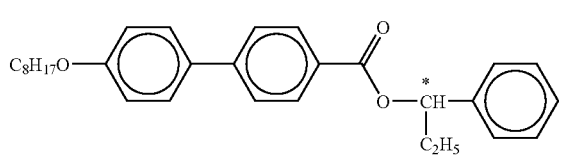
CM 47
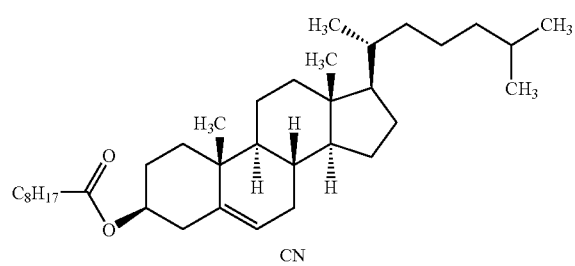
CN
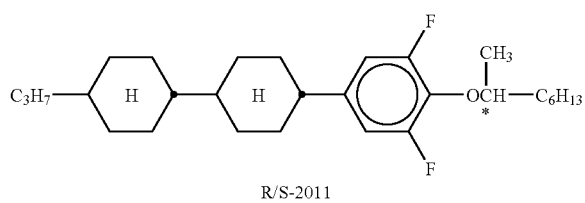
R/S-2011
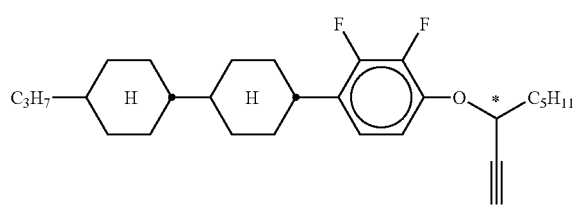
R/S-3011
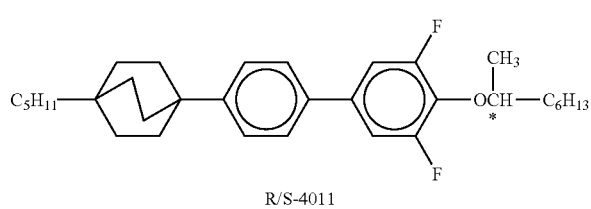
R/S-4011
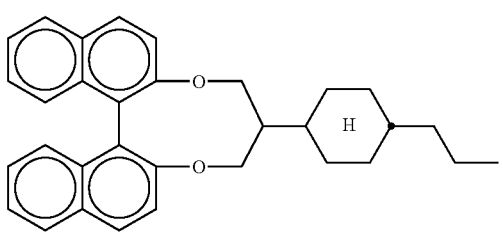
R/S-5011

TABLE B-continued

Table B indicates possible dopants which can be added to the LIQUID CRYSTALLINE media according to the invention.

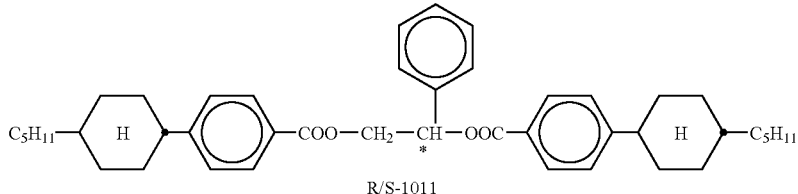

R/S-1011

The LIQUID CRYSTALLINE media preferably comprise 0 to 10% by weight, in particular 0.01 to 5% by weight and particularly preferably 0.1 to 3% by weight, of dopants. The LIQUID CRYSTALLINE media preferably comprise one or more dopants selected from the group consisting of compounds from Table B.

TABLE C

Table C indicates possible stabilisers which can be added to the LIQUID CRYSTALLINE media according to the invention.

(n here denotes an integer from 1 to 12)

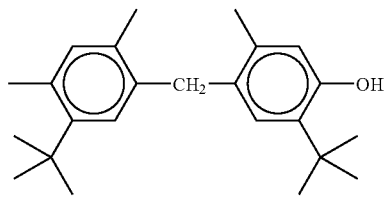

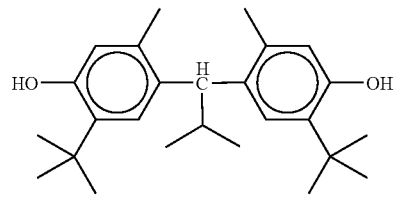

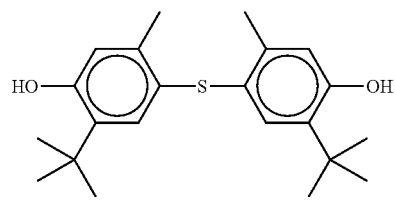

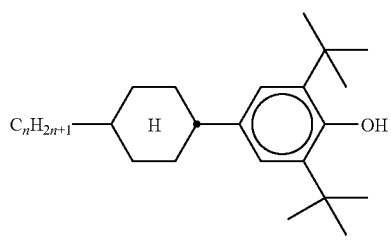

TABLE C-continued
Table C indicates possible stabilisers which can be added to the LIQUID
CRYSTALLINE media according to the invention.
(n here denotes an integer from 1 to 12)
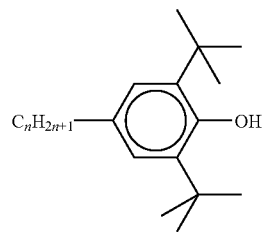
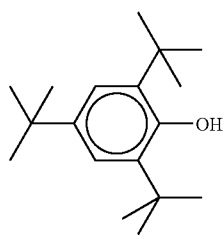
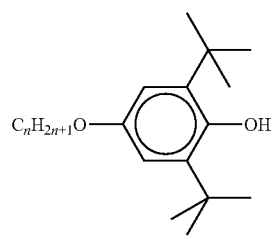
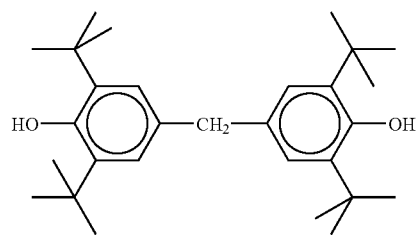
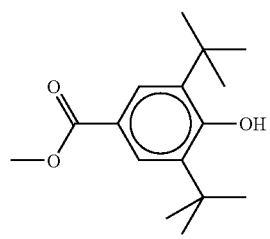
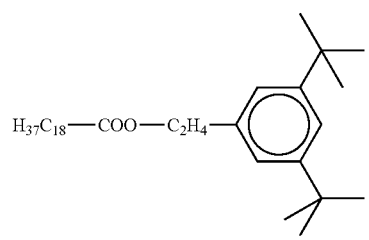

TABLE C-continued
Table C indicates possible stabilisers which can be added to the LIQUID CRYSTALLINE media according to the invention.
(n here denotes an integer from 1 to 12)
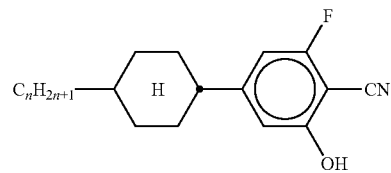
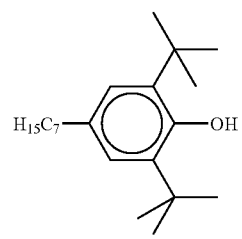
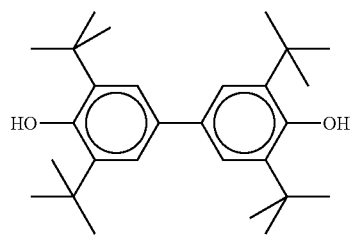
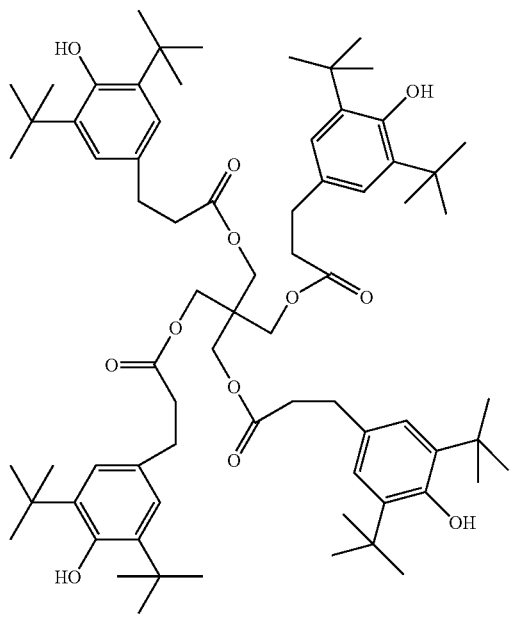
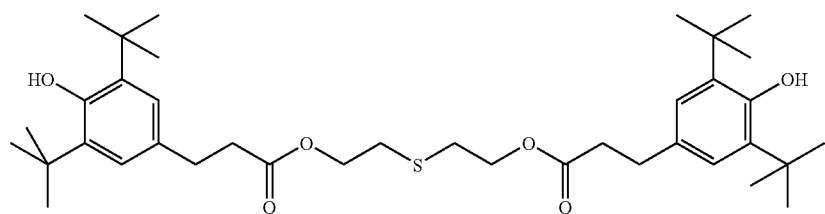

TABLE C-continued
Table C indicates possible stabilisers which can be added to the LIQUID CRYSTALLINE media according to the invention.
(n here denotes an integer from 1 to 12)
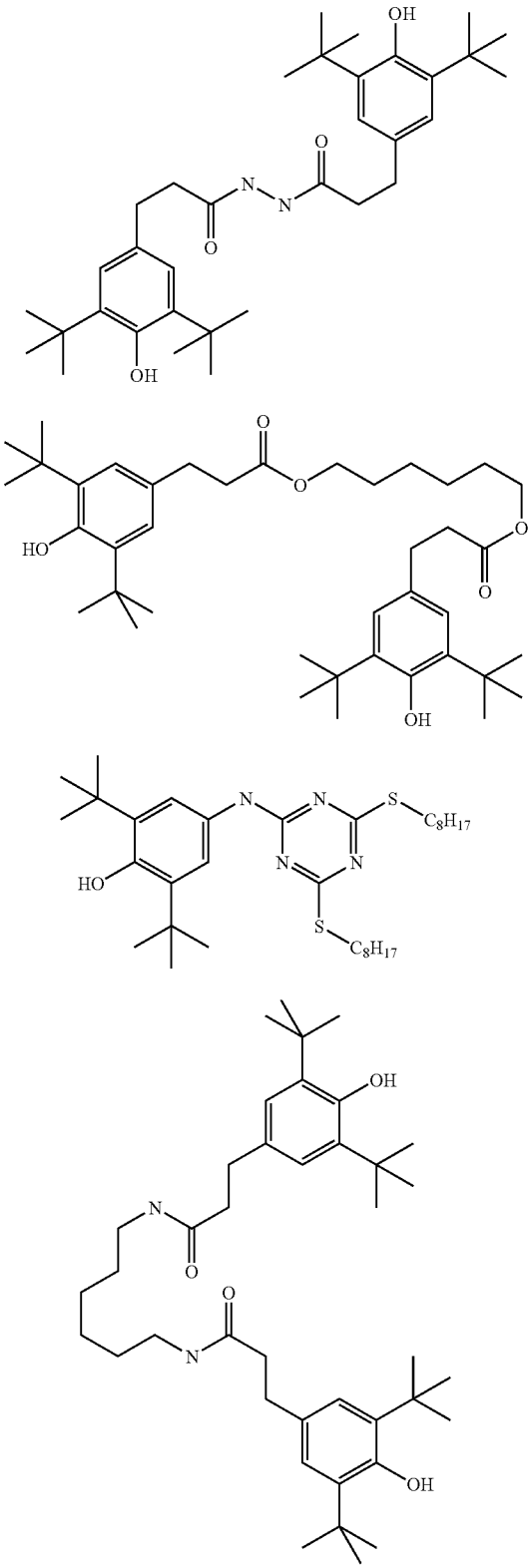

TABLE C-continued
Table C indicates possible stabilisers which can be added to the LIQUID CRYSTALLINE media according to the invention.
(n here denotes an integer from 1 to 12)
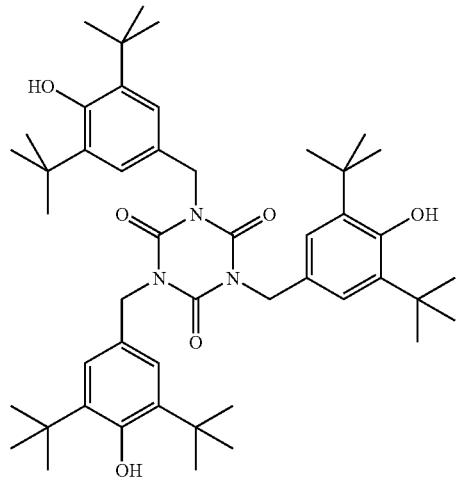
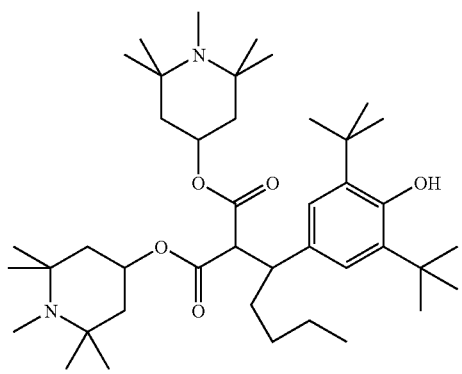
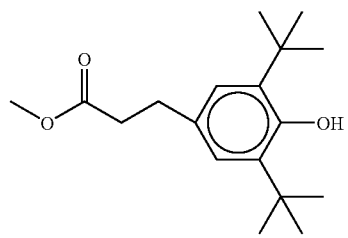
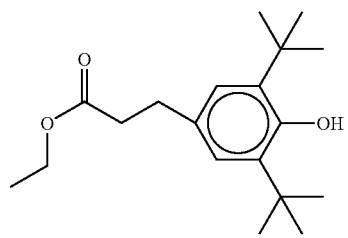

TABLE C-continued
Table C indicates possible stabilisers which can be added to the LIQUID
CRYSTALLINE media according to the invention.
(n here denotes an integer from 1 to 12)
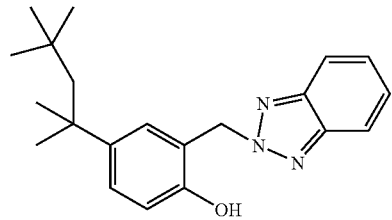
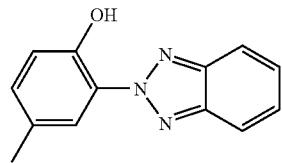
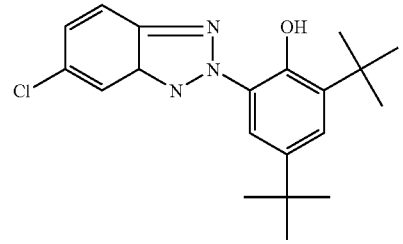
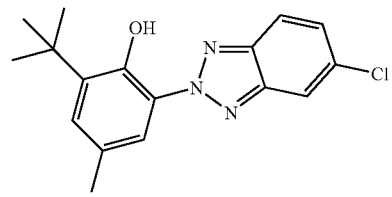
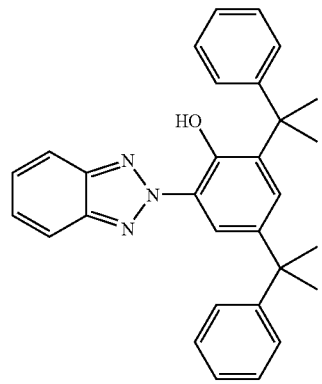
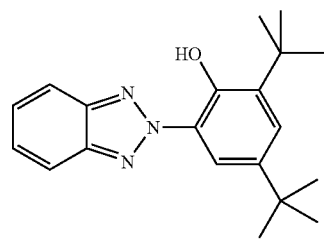

TABLE C-continued
Table C indicates possible stabilisers which can be added to the LIQUID
CRYSTALLINE media according to the invention.
(n here denotes an integer from 1 to 12)
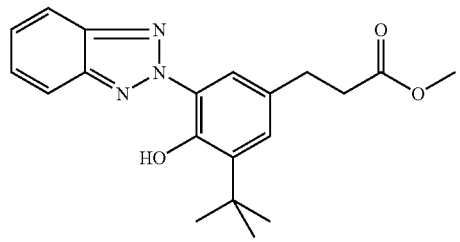
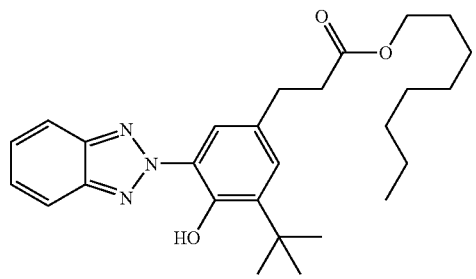
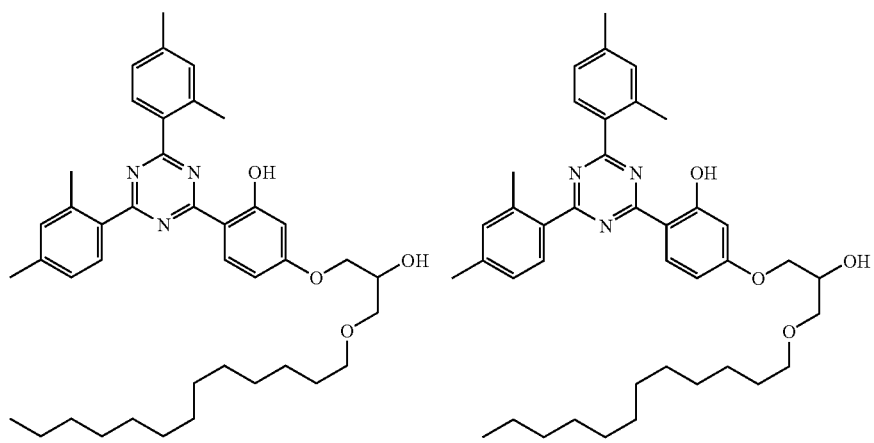
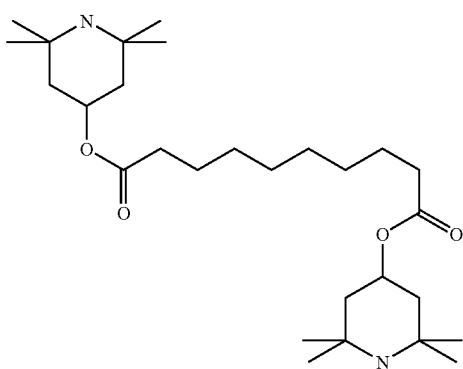

TABLE C-continued

Table C indicates possible stabilisers which can be added to the LIQUID CRYSTALLINE media according to the invention.
(n here denotes an integer from 1 to 12)

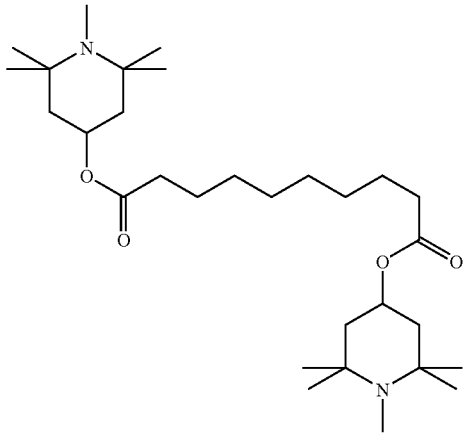

The LIQUID CRYSTALLINE media preferably comprise 0 to 10% by weight, in particular 0.01 to 5% by weight and particularly preferably 0.1 to 3% by weight, of stabilisers. The LIQUID CRYSTALLINE media preferably comprise one or more stabilisers selected from the group consisting of compounds from Table C.

In addition, the following abbreviations and symbols are used:

$V_0$ threshold voltage, capacitive [V] at 20° C.,
$n_e$ extraordinary refractive index at 20° C. and 589 nm,
$n_0$ ordinary refractive index at 20° C. and 589 nm,
$\Delta_n$ optical anisotropy at 20° C. and 589 nm,
$\in_\perp$ dielectric susceptibility perpendicular to the director at 20° C. and 1 kHz,
$\in_\parallel$ dielectric susceptibility parallel to the director at 20° C. and 1 kHz,
$\Delta\in$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN],
LTS low-temperature stability (phase), determined in test cells,
$HR_{20}$ voltage holding ratio at 20° C. [%] and
$HR_{100}$ voltage holding ratio at 100° C. [%].

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Unless explicitly noted otherwise, all concentrations, parts and percentages in the present application are indicated in per cent by weight and relate to the corresponding mixture or mixture component, unless explicitly indicated otherwise.

Unless explicitly noted otherwise, all temperature values indicated in the present application, such as, for example, the melting point T(C,N), the transition from the smectic (S) to the nematic (N) phase T(S,N) and the clearing point T(N,I) are indicated in degrees Celsius (° C.), M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ is determined at 1 kHz, unless explicitly indicated otherwise in each case.

For the present invention, the term "threshold voltage" relates to the capacitive threshold ($V_0$), also known as the Freedericksz threshold, unless explicitly indicated otherwise. In the examples, as is generally usual, the optical threshold for 10% relative contrast ($V_{10}$) May also be indicated.

The display used for measurement of the capacitive threshold voltage has two plane-parallel outer plates at a separation of 4 μm and electrode layers with overlying alignment layers of rubbed polyimide on the insides of the outer plates, which cause a homeotropic edge alignment of the liquid-crystal molecules.

The polymerizable compounds are polymerized in the display by UV irradiation for a pre-determined time, with a voltage simultaneously being applied to the display (usually 10 V to 30 V alternating current, 1 kHz). In the examples, unless indicated otherwise, a 28 mW/cm² mercury vapor lamp was used, the intensity was measured using a standard UV meter (model Ushio UNI meter) fitted with a 365 nm band-pass filter.

The tilt angle is determined by rotational crystal experiment (Autronic-Meliquid crystallinehers TBA-105). A small value (i.e. a large deviation from a 90° angle) corresponds to a large tilt here.

Unless described otherwise in the following examples, the measurements of the tilt angle are carried out as follows: 0.3% of a polymerizable monomeric compound is added to the LIQUID CRYSTALLINE host mixture, and the resultant mixture is introduced into VA-e/o test cells (rubbed at 90°, VA polyimide alignment layer, layer thickness d≈4 μm). The cell is irradiated for 2 minutes with UV light having the intensity I=50 mW/cm² with application of a voltage U=24 V (alternating current), causing polymerization of the monomeric compound. If desired, 0.006% of the photoinitiator Irgacure 651 is additionally added to the LIQUID CRYSTALLINE/monomer mixture in a second experiment, and the exposure time is shortened to 2 minutes. Before and after the UV irradiation, the tilt angle is determined by rotational crystal experiment (Autronic-Meliquid crystallinehers TBA-105). A small value (i.e. a large deviation from a 90° angle) corresponds to a large tilt here.

The HR value is measured as follows: 0.3% of a polymerizable monomeric compound is added to the LIQUID CRYSTALLINE host mixture, and the resultant mixture is introduced into TN-VHR test cells (rubbed at 90°, TN polyimide alignment layer, layer thickness d≈4 μm) The HR value is determined after 5 min at 100° C. before and after UV exposure (sun test) for 2 h at 1 V, 60 Hz, 64 μs pulse (measuring instrument: Autronic-Meliquid crystallinehers VHRM-105).

EXAMPLE 1

Nematic LIQUID CRYSTALLINE host mixture N1 is formulated as follows:

| | | | |
|---|---|---|---|
| CY-3-O4 | 23.50% | Cl.p. | +86.5 |
| CCY-3-O2 | 8.00% | Δn | 0.1199 |
| CCY-3-O3 | 8.00% | Δε | −4.1 |
| CCY-4-O2 | 1.50% | $\epsilon_\parallel$ | 3.7 |
| CPY-2-O2 | 10.00% | $K_3/K_1$ | 1.03 |
| CPY-3-O2 | 10.00% | $\gamma_1$ | 176 |
| PYP-2-3 | 12.00% | $V_0$ | 2.05 |
| PYP-2-4 | 2.50% | | |
| CCP-V-1 | 1.50% | | |
| CC-3-V1 | 8.00% | | |
| CC-5-V | 15.00% | | |

Polymerizable mixtures MM1 and MM2 according to the invention are prepared by addition of 0.3% of methacrylate compounds M1 and M2 to LIQUID CRYSTALLINE host mixture N1. In addition, polymerizable comparative mixtures MA1 and MA2 are prepared by addition of 0.3% of the structurally analogous acrylate compounds A1 and A2 to N1.

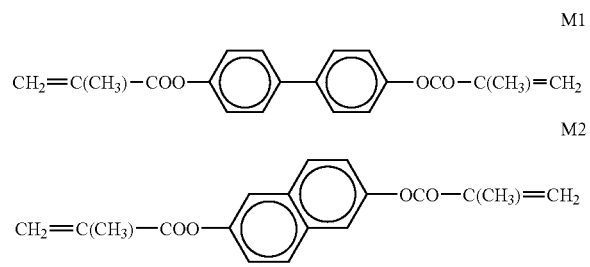

M1

M2

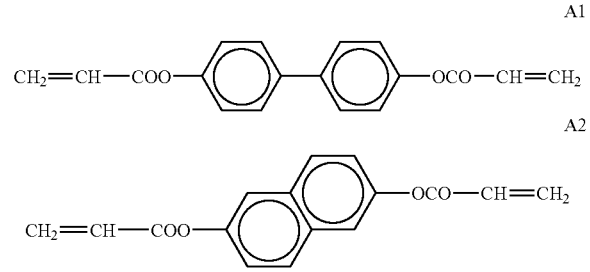

A1

A2

For all mixtures, the HR is measured at 100° C. (after a conditioning time of 5 minutes) as indicated above before and after UV exposure. For the polymerizable mixtures, the tilt angle after polymerization is additionally determined as indicated above (with no photoinitiator). The results are shown in Table 1.

TABLE 1

| Mixture | Monomer | HR [%] before UV | HR [%] after 2 h UV | Tilt [°] |
|---|---|---|---|---|
| N1 | — | 81.6 | 59.7 | — |
| MM1 | M1 | 79.8 | 75.2 | 75.7 |
| MM2 | M2 | 79.3 | 69.6 | 78.9 |
| MA1 | A1 | 79.3 | 47.4 | 88.2 |
| MA2 | A2 | 80.6 | 34.0 | 87.0 |

As evident from Table 1, mixtures MM1 and MM2 according to the invention with methacrylates exhibit significantly higher VHR values after UV exposure than comparative mixtures MA1 and MA2 with acrylates. In addition, mixtures MM1 and MM2 according to the invention with methacrylates exhibit significantly more pronounced tilt angles (i.e. lower ° values) than comparative mixtures MA1 and MA2 with acrylates.

EXAMPLE 2

Nematic LIQUID CRYSTALLINE mixture N2 is formulated as follows:

| | | | |
|---|---|---|---|
| CCH-501 | 9.00% | Cl.p. | +70.0 |
| CCH-35 | 14.00% | Δn | 0.0825 |
| PCH-53 | 8.00% | Δε | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

LIQUID CRYSTALLINE host mixtures N3-N8 are prepared by addition of in each case 10% of the alkenyl compounds CC-3-V, CC-4-V, CC-5-V, CC-1-V3, CC-3-V1, and the homologous compound CCH-34 with no alkenyl group, to LIQUID CRYSTALLINE mixture N2.

Polymerizable mixtures MM3-MM8 according to the invention are prepared by addition of 0.3% of methacrylate compound M1 to host mixtures N3-N8.

The tilt angle of the mixtures after polymerization is determined as indicated above (with no photoinitiator). The results are shown in Table 2.

TABLE 2

| Host mixture | Mixture | Added compound Acronym | Added compound Concentration | Tilt [°] |
|---|---|---|---|---|
| N3 | MM3 | CC-3-V | 10% | 82.9 |
| N4 | MM4 | CC-4-V | 10% | 82.7 |
| N5 | MM5 | CC-5-V | 10% | 82.7 |
| N6 | MM6 | CC-1-V3 | 10% | 83.3 |
| N7 | MM7 | CC-3-V1 | 10% | 82.7 |
| N8 | MM8 | CCH-34 | 10% | 82.5 |

As evident from Table 2, all mixtures MM3-MM8 according to the invention exhibit a significantly more pronounced tilt angle (i.e. small values between 82° and 84°). The tilt angle here is approximately the same for all alkenyl compounds, and also only slightly smaller than in the mixture comprising the "non-alkenyl compound" CCH-34. Only a slight adverse effect on the tilt angle is thus observed in the mixtures according to the invention due to addition of various alkenyl compounds with simultaneous use of methacrylates as polymerizable component.

EXAMPLE 3

LIQUID CRYSTALLINE host mixture N9 is prepared by addition of 20% of the alkenyl compound CC-3-V to LIQUID CRYSTALLINE mixture N2 from Example 2.

Polymerizable mixtures MM9-MM12 according to the invention are prepared by addition of 0.3% of methacrylate compounds M1 and M2 to LIQUID CRYSTALLINE host mixture N2 or N9. In addition, polymerizable comparative mixtures MA3-MA6 are prepared by addition of 0.3% of the structurally analogous acrylate compounds A1 and A2 to N2 or N9.

For all mixtures, the HR is measured as indicated above before and after UV exposure. For the polymerizable mixtures, the tilt angle after polymerization is additionally determined as indicated above (with no photoinitiator). The results are shown in Table 3.

TABLE 3

| Mixture | Host* | Monomer | HR [%] | | Tilt [°] |
| --- | --- | --- | --- | --- | --- |
| | | | before UV | after 2 h UV | |
| N2 | — | — | 92.5 | 88.1 | — |
| N9 | N2 | — | 98.2 | 96.3 | — |
| MM9 | N2 | M1 | 93.6 | 93.2 | 85.2 |
| MM10 | N9 | M1 | 97.8 | 91.0 | 86.7 |
| MM11 | N2 | M2 | 93.1 | 94.2 | 81.4 |
| MM12 | N9 | M2 | 97.9 | 89.5 | 83.8 |
| MA3 | N2 | A1 | 93.8 | 80.2 | 88.2 |
| MA4 | N9 | A1 | 97.8 | 67.8 | 89.5 |
| MA5 | N2 | A2 | 93.1 | 91.1 | 84.2 |
| MA6 | N9 | A2 | 97.0 | 55.0 | 89.9 |

*N9 = N2 + 20% of CC-3-V

As evident from Table 3, mixtures MM9-MM12 according to the invention with methacrylates generally exhibit significantly higher HR values after UV exposure and significantly higher tilt angles (i.e. lower ° values) than the analogous comparative mixtures MA3-MA6 with acrylates.

In addition, Table 3 shows that the pure LIQUID CRYSTALLINE host mixture N9 (with alkenyl compound CC-3-V) has a higher HR value compared with the pure LIQUID CRYSTALLINE host mixture N2 (with no alkenyl compound). This HR value is in some cases significantly reduced by addition of a polymerizable compound to the alkenyl-containing LIQUID CRYSTALLINE host mixture N9 (with alkenyl compound). By contrast, the 2o HR value in the case of N2 is in some cases even increased by addition of the polymerizable compound. However, the reduction in the HR value of N9 is significantly less pronounced on use of the methacrylates M1 and M2 than in the case of the acrylates A1 and A2.

The use of methacrylates thus helps to limit the drop in the HR in the case of alkenyl-containing LIQUID CRYSTALLINE host mixtures in the PS(A) display.

EXAMPLE 4

LIQUID CRYSTALLINE host mixture N10 is prepared by addition of 10% of compound CLY-3-O3 (with a cyclohexenyl group) to LIQUID CRYSTALLINE mixture N2 from Example 2.

Polymerizable mixtures MM13 and MM14 according to the invention are prepared by addition of 0.3% of the methacrylate compound N2 to LIQUID CRYSTALLINE host mixture N2 or N10. In addition, polymerizable comparative mixtures MA7 and MA8 are prepared by addition of 0.3% of the acrylate compound A1 to N2 or N10.

For the polymerizable mixtures, the tilt angle after polymerization is determined as indicated above (with no photoinitiator). The results are shown in Table 4.

TABLE 4

| Mixture | Host* | Monomer | Tilt [°] |
| --- | --- | --- | --- |
| MM13 | N2 | M2 | 81.4 |
| MM14 | N10 | M3 | 80.7 |
| MA7 | N2 | A1 | 88.2 |
| MA8 | N10 | A1 | 89.5 |

*N10 = N2 + 10% of CLY-3-O3

Mixtures MM13 and MM14 according to the invention with methacrylates exhibit significantly more pronounced tilt angles (i.e. lower ° values) than comparative mixtures MA7 and MA8 with acrylates.

The entire disclosures of all applications, patents and publications, cited herein and of corresponding German application No. 10 2007 050 262.3, filed Oct. 22, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof can make various changes and modifications of the invention to adapt it to various usages and conditions.

The invention claimed is:

1. A liquid-crystalline medium comprising one or more polymerizable compounds, where all polymerizable compounds present in the LIQUID CRYSTALLINE medium contain exclusively methacrylate groups as polymerizable groups, and one or more low-molecular-weight mesogenic or liquid-crystalline compounds containing one or more alkenyl groups which are stable to the polymerization of the methacrylate groups.

2. The liquid crystalline medium according to claim 1 comprising a polymerizable component A) comprising one or more polymerizable compounds, where all polymerizable compounds present in the liquid crystalline medium contain exclusively methacrylate group(s) as polymerizable group(s), and a liquid-crystalline component B) comprising one or more low-molecular-weight compounds, including at least one mesogenic or liquid-crystalline compound containing one or more alkenyl groups which are stable to the polymerization of the methacrylate groups.

3. The liquid crystalline medium according to claim 1, wherein the polymerizable component comprises one or more monoreactive polymerizable compounds containing one methacrylate group and one or more di- or multireactive polymerizable compounds containing two or more methacrylate groups.

4. The liquid crystalline medium according to claim 1, wherein the polymerizable component comprises exclusively direactive polymerizable compounds containing two methacrylate groups.

5. The liquid crystalline medium according to claim 1, wherein the polymerizable compounds have formula I:

$$R^a\text{-}A^1\text{-}(Z^1\text{-}A^2)_{m1}\text{-}R^b \qquad \text{I}$$

wherein:
$A^1$ and $A^2$ each, independently of one another, are an aromatic, heteroaromatic, alicyclic or heterocyclic group, which may also contain fused rings, and which is optionally mono- or polysubstituted by L, $Z^1$ is each independently —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, L, $R^a$ and $R^b$ each, independently of one another, are H, halogen, SF$_5$, NO$_2$, a carbon group or hydrocarbon group, where the compounds contain at least one radical L, $R^a$ and $R^b$ which denotes or contains a group P—Sp—, $R^0$ and $R^{00}$ each, independently of one another, are H or alkyl having 1 to 12 C atoms, P is CH$_2$=C(CH$_3$)—COO—, Sp is a spacer group or a single bond, m1 is 0, 1, 2, 3 or 4, n1 is 1, 2, 3 or 4.

6. The liquid crystalline medium according to claim 5, wherein
$A^1$ and $A^2$ each, independently of one another, denote 1,4-phenylene, naphthalene-1,4-diyl or naphthalene-2,6-diyl, in which, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or poly-substituted by L, L denotes P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, N(R$^x$)$_2$, optionally substituted silyl, optionally substituted aryl having 6 to 20 C atoms, or straight-chain or branched alkyl, alkoxy, alkyliquid crystallinearbonyl, alkoxycarbonyl, alkyliquid crystallinearbonyloxy or alkoxycarbonyloxy having 1 to 25 C atoms, in which, in addition, one or more H atoms may be replaced by F, Cl or P-Sp-, Y$^1$ denotes halogen, R$^x$ denotes P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl or P-Sp-, an optionally substituted aryl or aryloxy group having 6 to 40 C atoms, or an optionally substituted heteroaryl or heteroaryloxy group having 2 to 40 C atoms, $R^a$ and $R^b$ each, independently of one another, denote P-Sp-, H, L as defined above, or straight-chain or branched alkyl having 1 to 25 C atoms, in which, in addition, one or more non-adjacent CH$_2$ groups may each be replaced, independently of one another, by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN or P-Sp-, where at least one of the radicals $R^a$, $R^b$ and L contains at least one group P-Sp-.

7. The crystalline medium according to claim 5, wherein the polymerizable compounds have the following sub-formulae:

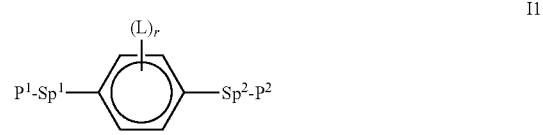

I1

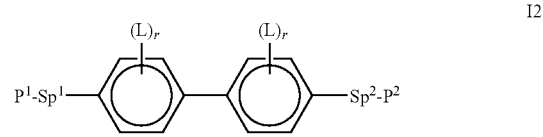

I2

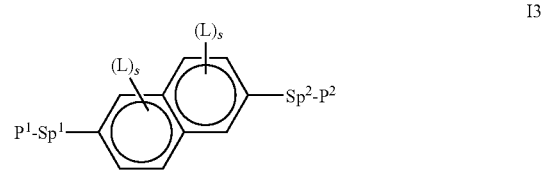

I3

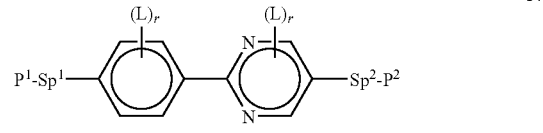

I4

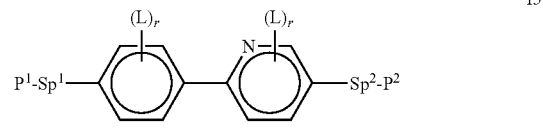

I5

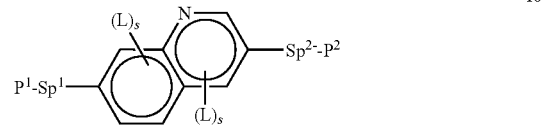

I6

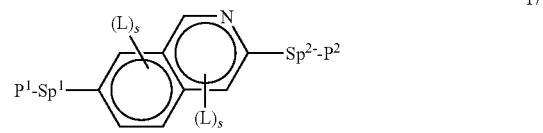

I7

-continued

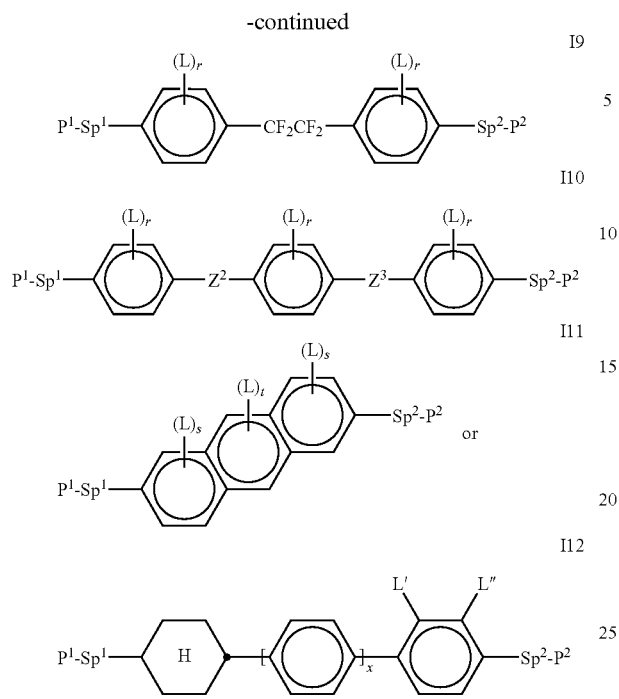

in which
P¹ and P² have the meaning indicated for P,
Sp¹ and Sp² have one of the meanings indicated for Sp or denote a single bond,
Z² and Z³ each, independently of one another, denote —COO— or —OCO,
L' and L" each, independently of one another, denote H, F or Cl,
r denote 0, 1, 2, 3 or 4,
s denote 0, 1, 2 or 3,
t denote, 1 or 2,
x denote 0 or 1 and
R$^y$ and R$^z$ each, independently of one another, denote H or CH$_3$.

8. The liquid crystalline medium according to claim 1, wherein the low-molecular-weight component comprises one or more compounds of the following formulae:

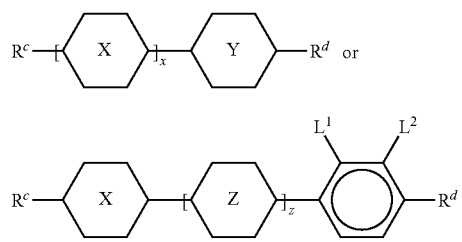

in which independently in each compound,

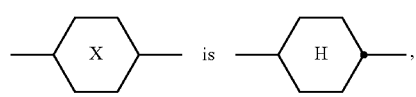

-continued

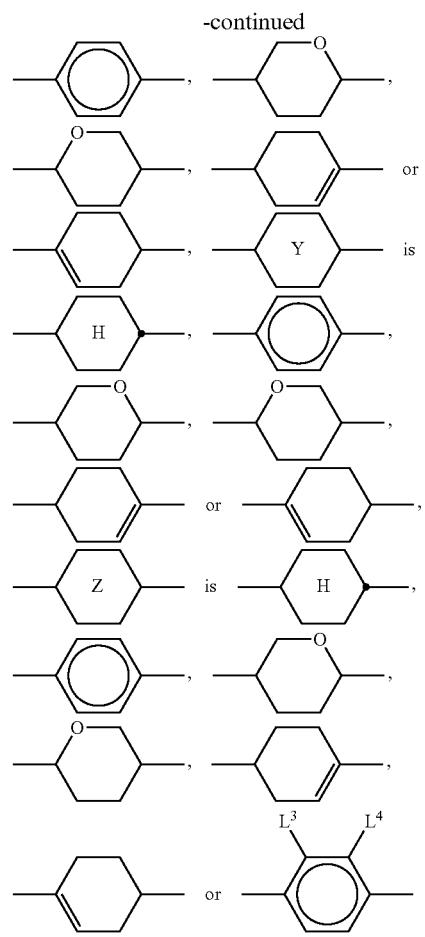

R$^c$ alkenyl having 2 to 9 C atoms or, if at least one of the rings X, Y and Z denotes cyclohexenyl, also one of the meanings of R$^d$,
R$^d$ is alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another,
L$^{1-4}$ each, independently of one another, are H, F, Cl, OCF$_3$, CF$_3$, CH$_3$, CH$_2$F or CHF$_2$H,
x is 1 or 2, and
z is 0 or 1.

9. The liquid crystalline medium according to claim 1, wherein the low-molecular-weight component comprises one or more compounds of the following formulae:

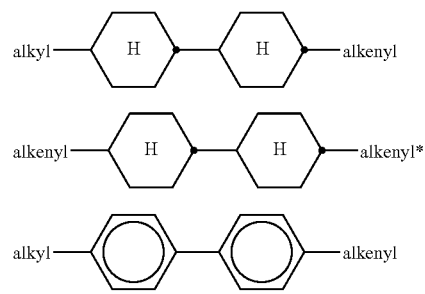

-continued

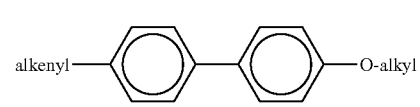
A4

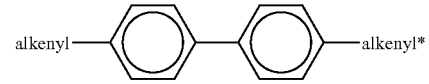
A5

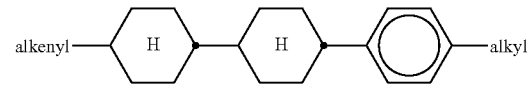
A6

A7

A8

A9

A10

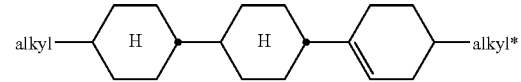
A11

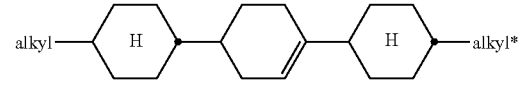
A12

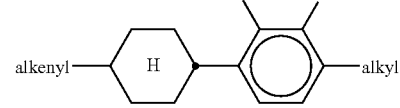
B1

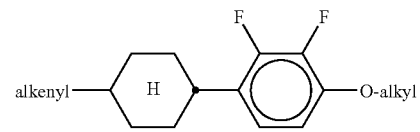
B2

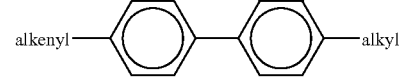
B3

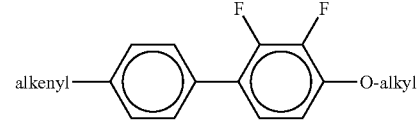
B4

-continued

B5

B6

B7

B8

B9

B10

B11 or

B12 in which alkyl and alkyl* independently denote a straight-chain alkyl radical having 1-6 C atoms, and alkenyl and alkenyl* each, independently of one another, denote a straight-chain alkenyl radical having 2-7 C atoms.

10. The liquid crystalline medium according to claim 1, wherein the low-molecular-weight component comprises one or more compounds of the following formulae:

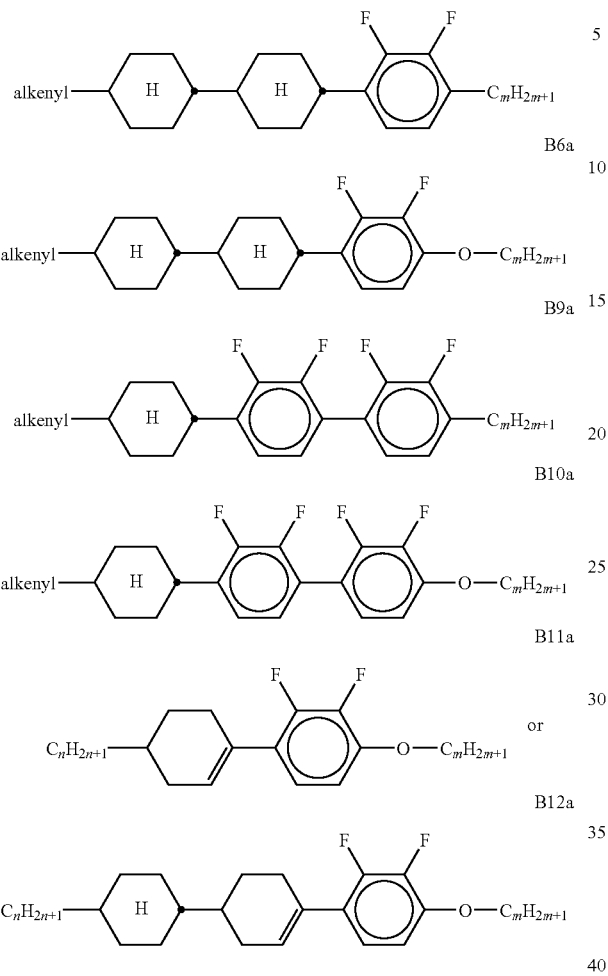

in which m and n each, independently of one another, denote 1, 2, 3, 4, 5 or 6, and alkenyl denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

11. The liquid crystalline medium according to claim 1, further comprising one or more compounds of the following formulae:

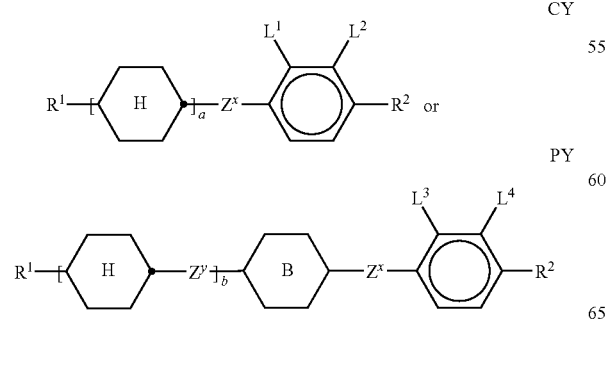

in which
a is 1 or 2,
b is 0 or 1,

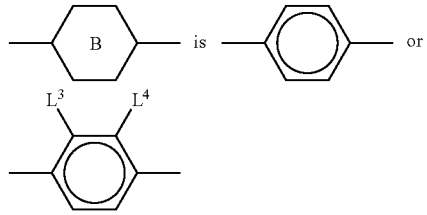

R$^1$ and R$^2$ each, independently of one another, are alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, Z$^x$ and Z$_y$ are each, independently of one another, —CH=CH—, —CH$_2$O—, —OCH$_2$—, —CF$_2$O—, —OCF$_2$—, —O—, —CH$_2$—, —CH$_2$CH$_2$— or a single bond, L$^{1-4}$ are each, independently of one another, F, Cl, OCF$_3$, CF$_3$, CH$_3$, CH$_2$F, CHF$_2$.

12. The liquid crystalline medium according to claim 1, further comprising one or more compounds of the following formula:

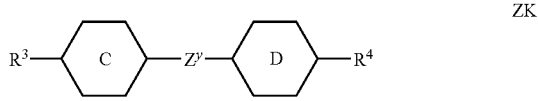

in which

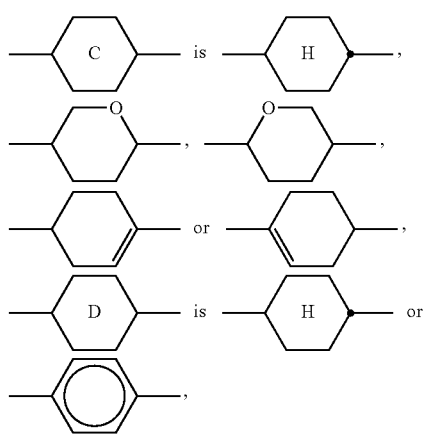

R$^3$ and R$^4$ each, independently of one another, are alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another, and Z$^y$ is —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

13. A liquid crystalline display containing a liquid crystalline medium according to claim 1.

14. The liquid crystalline display according to claim 13, which display is a PSA-VA, PSA-OCB, PS-IPS, PS-FFS or PS-TN display.

15. The liquid crystalline display according to claim 14, containing an liquid crystalline cell having two substrates, where at least one substrate is transparent to light and at least one substrate has an electrode layer, and a layer of an liquid crystalline medium comprising a polymerized component and a low-molecular-weight component located between the substrates, where the polymerized component is obtainable by polymerization of one or more polymerizable compounds between the substrates of the liquid crystalline cell in the liquid crystalline medium with application of an electrical voltage.

16. A process for the preparation of the liquid crystalline medium according to claim 1 comprising mixing the one or more low-molecular-weight liquid-crystalline compounds with the one or more polymerizable compounds and optionally with further liquid-crystalline compounds and/or additives.

* * * * *